(12) United States Patent
Mirho et al.

(10) Patent No.: US 11,823,297 B2
(45) Date of Patent: Nov. 21, 2023

(54) MACHINE DISPLAY OPERATION SYSTEMS AND METHODS

(71) Applicant: Rowan TELS Corp., Seattle, WA (US)

(72) Inventors: Charles A. Mirho, Vancouver, WA (US); Chad Kirby, Seattle, WA (US); James A. Billmaier, Woodinville, WA (US); Edward Flinchem, Gold Bar, WA (US)

(73) Assignee: ROWANTELS CORP., Seattle, WA (US)

( * ) Notice: Subject to any disclaimer, the term of this patent is extended or adjusted under 35 U.S.C. 154(b) by 0 days.

(21) Appl. No.: 17/815,103

(22) Filed: Jul. 26, 2022

(65) Prior Publication Data

US 2022/0357839 A1    Nov. 10, 2022

Related U.S. Application Data

(63) Continuation of application No. 14/875,319, filed on Oct. 5, 2015.

(60) Provisional application No. 62/059,964, filed on Oct. 5, 2014.

(51) Int. Cl.
| | | |
|---|---|---|
| G06Q 50/18 | (2012.01) | |
| G06F 3/04847 | (2022.01) | |
| G06F 3/0486 | (2013.01) | |

(52) U.S. Cl.
CPC ......... G06Q 50/184 (2013.01); G06F 3/0486 (2013.01); G06F 3/04847 (2013.01)

(58) Field of Classification Search
CPC . G06Q 50/184; G06F 3/04847; G06F 3/0486; G06F 40/30; G06F 40/258
See application file for complete search history.

(56) References Cited

U.S. PATENT DOCUMENTS

| | | |
|---|---|---|
| 4,710,763 A | 12/1987 | Franke et al. |
| 5,432,897 A | 7/1995 | Tatsumi et al. |
| 5,623,679 A | 4/1997 | Rivette et al. |
| 5,623,681 A | 4/1997 | Rivette et al. |
| 5,701,137 A | 12/1997 | Kiernan et al. |
| 5,799,325 A | 8/1998 | Rivette et al. |
| 5,930,746 A * | 7/1999 | Ting .................. G06F 40/49 704/9 |
| 6,154,757 A | 11/2000 | Krause et al. |
| 6,307,548 B1 | 10/2001 | Flinchem et al. |
| 6,339,767 B1 | 1/2002 | Rivette et al. |
| 6,466,240 B1 | 10/2002 | Maslov |

(Continued)

*Primary Examiner* — Kieu D Vu
*Assistant Examiner* — Alvaro R Calderon, IV
(74) *Attorney, Agent, or Firm* — Rowan TELS LLC

(57) ABSTRACT

A method of operating a machine via a display device user interface includes generating a text tree display control comprising a tree of text blocks on a first portion of a machine display interface, generating a term control comprising individual terms identified in the text tree display control on a second portion of the machine display interface, generating a navigation control comprising a visual representation of each branch of the text tree display control on a third portion of the machine display interface, operating an individual area of the term control comprising an individual term, to highlight and change all instances of the individual term in the text tree display control, and operating the navigation control to reorder branches of the text tree display control.

12 Claims, 21 Drawing Sheets

(56) References Cited

U.S. PATENT DOCUMENTS

| | | |
|---|---|---|
| 6,610,106 B1 | 8/2003 | Jenks |
| 7,003,516 B2 | 2/2006 | Dehlinger et al. |
| 7,024,408 B2 | 4/2006 | Dehlinger et al. |
| 7,529,743 B1 | 5/2009 | Ershov |
| 7,610,185 B1 | 10/2009 | Ershov |
| 2001/0045960 A1 | 11/2001 | Keeley |
| 2002/0038321 A1 | 3/2002 | Keeley |
| 2003/0214538 A1 | 11/2003 | Farrington et al. |
| 2004/0059994 A1 | 3/2004 | Fogel et al. |
| 2004/0205638 A1 | 10/2004 | Thomas et al. |
| 2005/0005239 A1 | 1/2005 | Richards |
| 2006/0190807 A1 | 8/2006 | Tran |
| 2007/0057967 A1 | 3/2007 | Armstrong |
| 2007/0136321 A1 | 6/2007 | Allen et al. |
| 2008/0005103 A1 | 1/2008 | Ratcliffe et al. |
| 2008/0148190 A1 | 6/2008 | Schaff |
| 2009/0055762 A1 | 2/2009 | Stiso |
| 2009/0327240 A1 | 12/2009 | Meehan et al. |
| 2010/0228693 A1 | 9/2010 | Dawson et al. |
| 2010/0313258 A1 * | 12/2010 | Chaudhuri ............ G06F 40/247 726/9 |
| 2012/0042242 A1 | 2/2012 | Garland et al. |
| 2012/0284199 A1 | 11/2012 | Lundberg |
| 2013/0007671 A1 | 1/2013 | Hammontree et al. |
| 2013/0061182 A1 | 3/2013 | Weise et al. |
| 2013/0204897 A1 | 8/2013 | McDougall |

* cited by examiner

Claims Builder

1300 https://patentnavigation.com/application/676/claim/1

What is claimed is:

Claim 1. A computer-implemented method for automatically identifying a claim term, the method comprising:

obtaining a claim string comprising at least one patent claim;

identifying a possible claim term within the claim string;

searching for the possible claim term elsewhere in a patent application that is associated with the at least one patent claim; and identifying the possible claim term as an actual claim term when the possible claim term is found elsewhere in the patent application.

| TERMS | VALIDATE |
|---|---|
| CLAIM TERMS | |
| actual claim term | |
| at least one patent claim | |
| claim string | |
| patent application | |
| possible claim term | |
| OTHER TERMS | |

MACHINE DISPLAY OPERATION SYSTEMS AND METHODS

CROSS REFERENCE TO RELATED APPLICATIONS AND PRIORITY CLAIM

This application claims priority and benefit under 35 U.S.C. 119 to US application serial no. U.S. 62/059,964, filed on Oct. 5, 2014, which is incorporated by reference herein in its entirety.

FIELD

This disclosure is directed to the field of machine user interfaces, and more particularly to various systems and methods for controlling the operation of a machine via controls on a machine display.

BRIEF DESCRIPTION OF THE DRAWINGS

FIGS. 13-19 illustrate aspects of an exemplary machine display user-interface, such as may be displayed on and operated via a machine display operation device in accordance with one embodiment.

DESCRIPTION

Figure 1:
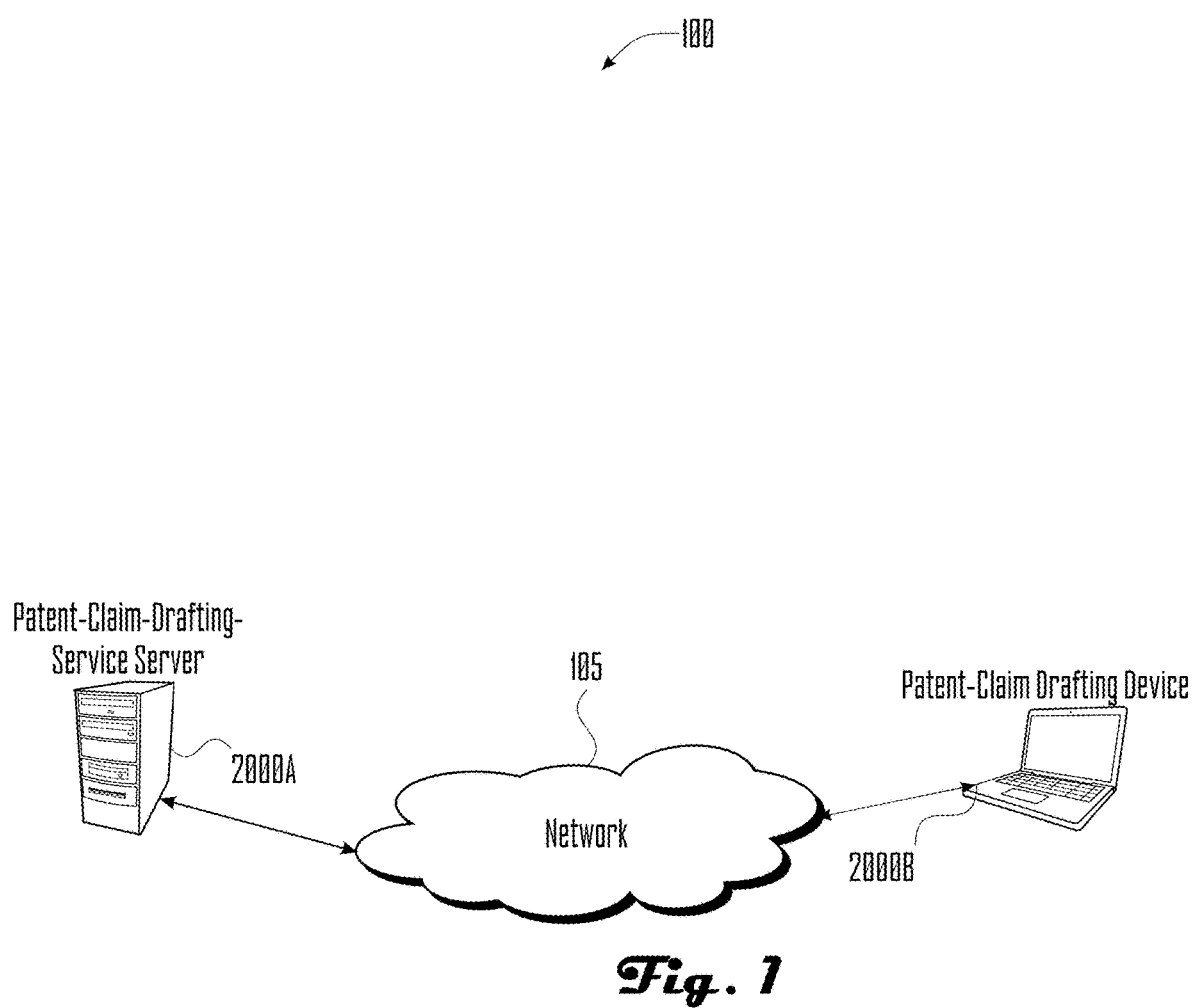
FIG. 1 illustrates a simplified machine display operation system in which one or more of a server and machine display operation device are connected to a network.

The phrases "in one embodiment", "in various embodiments", "in some embodiments", and the like are used repeatedly. Such phrases do not necessarily refer to the same embodiment. The terms "comprising", "having", and "including" are synonymous, unless the context dictates otherwise.

Many of the machine symbol sequence burdens described above can be mitigated to some extent by providing computer-implemented facilities for identifying, using, re-using, and editing "terms" within a text block on a machine display. As the term is used herein, a "term" refers to a word or phrase (often a noun or noun phrase) that appears one or more times within the text and that must be referred to such that it is always clear as to what element the term is making reference.

In many cases, "term" words or phrases must also be used outside the text block (e.g., in the drawings and/or description associated with the text block). In order to provide proper support for the term, it is important that the concept referred to by the term is referred to throughout the drawings and description using consistent terminology.

To facilitate consistent and proper use of such terms throughout, various embodiments (described further below) may implement features to formalize terms as an operable machine display structure.

In various embodiments, terms may be automatically identified in an existing text tree. In some embodiments, terms may be automatically identified by searching a text string in machine memory, as visualized on a machine display, for the longest substrings that are repeated, that are preceded by an article, and that do not end with or include certain 'stop' words that are pre-defined by the machine to be not included in a term.

In some embodiments, the operator may indicate (e.g., by selection) certain words and/or phrases that should be promoted to term status.

Once one or more terms have been identified (automatically or manually), various embodiments may provide facilities (e.g., a term machine display control area) by which the operator may re-use a term in the visual text tree display or elsewhere in a document. In some embodiments, a term machine display control area may provide auto-complete functionality, typing shortcuts, or similar text-entry accelerators to facilitate easy and accurate use of terms.

Further, many embodiments may provide facilities to enable the operator to revise a previously-defined term such that the revision applies to all instances of that term in the text or drawings.

In addition, it is common for the operator to employ one or more variations on a given term. For example, a 'base' term (e.g., 'widget') may often be employed in a plural variant (e.g., 'widgets') and/or a collective variant (e.g., 'plurality of widgets').

To that end, some embodiments may provide facilities to automatically generate term variants (e.g., using common natural-language-processing techniques) and to populate a term machine display control area with such variants for subsequent use and re-use in the document or drawings.

In some embodiments, an automatically-generated term variant may include a variant whose introductions and references are automatically managed based on context. For example, some embodiments may automatically generate a variant that would appear as "a widget" the first time it appears in a given context, but that would appear as "the widget" on second and subsequent references within the same context.

Some embodiments may provide a facility to help the operator visually identify occurrences of a given term within a set of tree linked visual elements (textual blocks linked in a tree structure on a machine display interface). Some such embodiments may display occurrences of a given term such that the operator can visually distinguish between introductions of a term (e.g., "a widget") and reference forms of the term (e.g., "the widget"). Some embodiments may further provide validations and/or warnings when a given term is used in such a way that it may be unclear as to what element the term was making reference.

In many cases, terms are introduced and referenced using the exact same string, differing only in the type or article that precedes the term (e.g., "a widget"/"the widget"). However, in some cases, the operator may employ an 'irregular' introduction and/or reference to a given term. For example, in one common 'irregular' term pattern, a term may be introduced as the object of a verb (e.g., "selecting a widget") and then be subsequently referred to using an adjective derived from the verb (e.g., "the selected widget"). In some embodiments, 'irregular' term introductions that fit this pattern may be automatically identified by using natural-language-processing techniques adapted to stem a first word of a possible term (e.g., to derive "select" from "selected") and then to search for the remaining words of the possible term preceded by a word derived from the stemmed first word (e.g., to search logic control pattern similar to /\bse-lect.+\ bwidget\b/).

Some embodiments may provide facilities to select and/or analyze a corpus of text and drawings according to the terms that they make use of. In some embodiments, a similarity metric between two or more corpuses may be computed based on the extent to which their respective sets of terms overlap.

More particularly, as discussed herein, in various embodiments, a processor and/or processing device may be configured (e.g., via non-transitory computer-readable storage media) to perform a first method for automatically identifying a term, the first method including steps similar to some or all of the following:

obtaining a string comprising at least one text tree control;
    identifying a possible term within the string;
    searching for the possible term elsewhere in a document that is associated with the at least one text tree control;
    identifying the possible term as an actual term when the possible term is found elsewhere in the document;
    determining a shortened version of the possible term;
    searching for the shortened version elsewhere in the text tree control; and/or
    identifying the shortened version as an actual term when the shortened version is found elsewhere in the associated document.

In some cases, searching for the possible term elsewhere in the document may include elements similar to some or all of the following:

obtaining a plurality of labels shown in a drawing of the document;
    searching for the possible term among the plurality of labels;
    obtaining a plurality of defined terms from a glossary of the document;
    searching for the possible term among the plurality of defined terms; and/or searching for the possible term elsewhere in the string comprising the at least one text corpus and associated drawings.

In some cases, identifying the possible term within the string may include steps similar to some of all of the following:

locating within the string a preceding word, phrase, and/or token that typically precedes terms;
    determining a likely start-point based at least in part on the preceding word, phrase, and/or token;
    locating within the string a succeeding word, phrase, and/or token that typically follows terms;
    determining a likely end-point based at least in part on the succeeding word, phrase, and/or token; and/or
    identifying a word and/or phrase between the start-point and the end-point as the possible term, or the like.

In some cases, the preceding word, phrase, and/or token may include a definite or indefinite article, or the like.

In some cases, the succeeding word, phrase, and/or token may include a selected one of a clause terminating punctuation token and a linking verb, or the like.

In various embodiments, a processor and/or processing device may be configured (e.g., via non-transitory computer-readable storage media) to perform a second method for automatically identifying a term, the second method including steps similar to some or all of the following:

obtaining a string comprising at least one text corpus and/or associated drawings;
    identifying within the string a possible term comprising a first word and one or more subsequent words;
    stemming the first word to obtain a root form of the first word; and/or
    identifying the possible term as an actual term when the root form is found to precede the one or more subsequent words within an element of the at least one text corpus and associated drawings.

In various embodiments, a processor and/or processing device may be configured (e.g., via non-transitory computer-readable storage media) to perform a third method for facilitating the forming on a machine display of a new set of text corpus and associated drawings, the third method including steps similar to some or all of the following:

automatically selecting a corpus of documents that describe similar subject matter to that which will be identified in a visual text tree display in the new set of text corpus and associated drawings;
    automatically determining a plurality of corpus terms that appear in the corpus; and/or providing a term machine display control area to facilitate re-use of the plurality of corpus terms when forming on a machine display the new visual text tree display.

In some cases, automatically selecting the corpus may include elements similar to some or all of the following:
  determining a subject-matter classification associated with the new visual text tree display;
  identifying a plurality of documents that correspond to the subject-matter classification;
  identifying a plurality of terms that appear or will appear in the new visual text tree display;
  automatically identifying terms that appear in a multiplicity of documents; and/or
  selecting from among the multiplicity of documents a plurality of documents whose visual text tree display uses a similar set of terms to the plurality of identified terms.

In various embodiments, a processor and/or processing device may be configured (e.g., via non-transitory computer-readable storage media) to perform a fourth method for automatically populating a term machine display control area, the fourth method including steps similar to some or all of the following:
  identifying a base form of a term;
  automatically generating an elaborated version of the base form; and/or
  automatically populating the term machine display control area with the elaborated version to facilitate re-use of the elaborated version when forming on a machine display a visual text tree display.

In some cases, automatically generating the elaborated version may include elements similar to some or all of the following:
  determining a plural form of the base form;
  automatically populating the term machine display control area with the plural form;
  determining a collective form of the base form;
  automatically populating the term machine display control area with the collective form;
  determining an antecedent-managed form of the base form; and/or
  automatically populating the term machine display control area with the antecedent-managed form, wherein the antecedent-managed form is managed such that the term is automatically introduced using an indefinite article or no article depending on whether the term is singular or plural, and wherein the term is automatically referenced after introduction using a definite article.

In various embodiments, a processor and/or processing device may be configured (e.g., via non-transitory computer-readable storage media) to perform a fifth method for analyzing a visual text tree display, the fifth method including steps similar to some or all of the following:
  obtaining the visual text tree display;
  identifying a plurality of terms that appear in the visual text tree display;
  presenting the plurality of terms as a reusable term machine display control area;
  providing a control to selectively highlight the plurality of terms as they appear in the visual text tree display;
  analyzing the visual text tree display to identify possible antecedent-basis errors among the plurality of terms as they appear in the visual text tree display; and/or
  analyzing the visual text tree display to identify unsupported terms that lack support in drawings and/or a description associated with the visual text tree display.

In some cases, the selectively highlighting enables a machine display operator to visually distinguish between an introduction of a given term and a reference to the given term.

In some cases, the selectively highlighting enables a machine display operator to visually distinguish between a first term, which is properly introduced before it is referenced, and a second term, which is referenced before it is properly introduced.

In some cases, the selectively highlighting enables a machine display operator to visually distinguish between a third term, which appears in the drawings and/or the description associated with a machine text display tree, and a fourth term, which does not appear in the drawings and/or the description.

In various embodiments, a processor and/or processing device may be configured (e.g., via non-transitory computer-readable storage media) to perform a sixth method for facilitating a machine display operator to define terms during real-time machine display operation, the sixth method including steps similar to some or all of the following:
  capturing a sequence of key strokes as they are entered by the machine display operator into a text-entry field;
  determining likely start- and end-points based at least in part on the sequence of key strokes;
  identifying a word and/or phrase between the start- and end-points as a term; and/or
  providing a control by which the machine display operator can optionally adjust the start- and end-points before confirming the word and/or phrase between the start- and end-points as the term.

In some cases, determining the start- and end-points may include determining that a first subset of the sequence of key strokes corresponds to a preceding word, phrase, and/or token that typically precedes terms; and
  determining that a second subset of the sequence of key strokes corresponds to a succeeding word, phrase, and/or token that typically follows terms, or the like.

In some cases, the preceding word, phrase, and/or token may include a definite or indefinite article, or the like.

In some cases, the succeeding word, phrase, and/or token may include a selected one of a clause terminating punctuation token and a verb, or the like.

Described more fully below are many additional details, variations, and embodiments that may or may not include some or all of the steps, features, and/or functionality described above.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

FIG. 1 illustrates a simplified machine display operation system in which one or more of text corpus and associated drawings—forming on a machine display server 2000A and machine display operation device 2000B are connected to network 105.

In various embodiments, network 105 may include the Internet, a local area network ("LAN"), a wide area network ("WAN"), and/or other data network. In addition to traditional data-networking protocols, in some embodiments, data may be communicated according to protocols and/or standards including near field communication ("NFC"), Bluetooth, power-line communication ("PLC"), and the like.

In some embodiments, machine display operation device 2000 (see FIG. 20, discussed below) may provide text corpus and associated drawings—forming on a machine display, such as described more fully herein.

In some embodiments, some or all of the machine display operations described herein may be performed by machine display operation device 2000B, which represents one or more computing devices that are capable being used to manipulate visual elements and connect those manipulations with character sequence alterations, specifically a text tree memory structure (optionally in communication with text corpus and associated drawings—forming on a machine display-server 2000A).

In various embodiments, machine display operation device 2000B and/or text corpus and associated drawings—forming on a machine display-server 2000A may comprise any suitable type of computing device, including desktop PCs, mobile phones, laptops, tablets, wearable computers, or other computing devices.

In various embodiments, additional infrastructure (e.g., short message service centers, cell sites, routers, gateways, firewalls, and the like), as well as additional devices may be present. Further, in some embodiments, the functions described as being provided by some or all of text corpus and associated drawings—forming on a machine display-server 2000A may be implemented via various combinations of physical and/or logical devices.

However, it is not necessary to show such infrastructure and implementation details in FIG. 1 in order to describe an illustrative embodiment.

Figure 21:
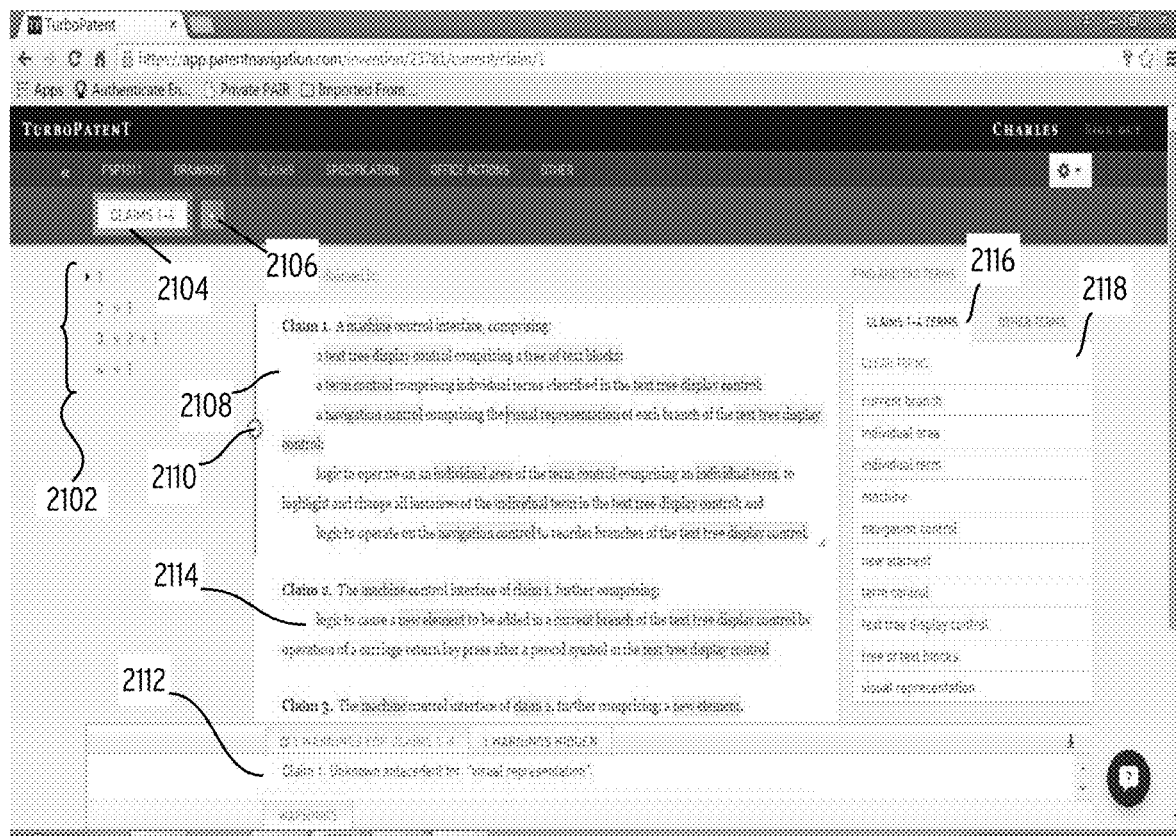
FIG. 21 illustrates an exemplary machine display user-interface, such as may be displayed on and operated via a machine display operation device in accordance with one embodiment.

FIG. 21 illustrates an exemplary machine display user-interface, such as may be displayed on and operated via a machine display operation device in accordance with one embodiment. A machine user interface control for a machine display device comprises control elements operable to affect the operation of the machine. These elements include text tree display control navigation control 2102, text tree display control family control 2104, add text tree display control family control 2106, root element of text tree display control 2108, control to operate on entirety of root element 2110, warnings control for text tree display control 2112, dependent element of text tree display control 2114, term control for terms in text tree display control family 2116, and term control for terms not in text tree display control family 2118. Operation of each of these controls and their effects on operation of a machine coupled to the display will be explained throughout this description by way of example.

In some embodiments, a method may include generating a text tree display control, generating a term control, generating a navigation control, operating an individual area of the term control, and/or operating the navigation control to reorder branches of the text tree display control.

In some embodiments, the generating a text tree display control may include a tree of text blocks on a first portion of a machine display interface.

In some embodiments, the generating a term control may include individual terms identified in the text tree display control on a second portion of the machine display interface.

In some embodiments, the generating a navigation control may include a visual representation of each branch of the text tree display control on a third portion of the machine display interface.

In some embodiments, the operating an individual area of the term control may include an individual term, to highlight and change all instances of the individual term in the text tree display control.

In some embodiments, such a method may further include adding a new text block to a current branch of the text tree display control by operation of a carriage return key press after a period symbol in the text tree display control.

In some embodiments, such a method may further include dragging a family control for the text tree display control on the machine display interface to cause a reordering and renumbering of all elements of the text tree display control.

In some embodiments, such a method may further include dragging an individual area of the navigation control to reorder elements within the text tree display control.

In some embodiments, such a method may further include analyzing a structure and a content of the text tree display control and displaying errors resulting from the analyzing in a fourth portion of the machine display interface.

In some embodiments, such a method may further include the term control.

In some embodiments, the method may include individual controls to affect terms in the text tree display control and a separate tab with individual controls to affect terms not in the text tree display control.

Figure 2:
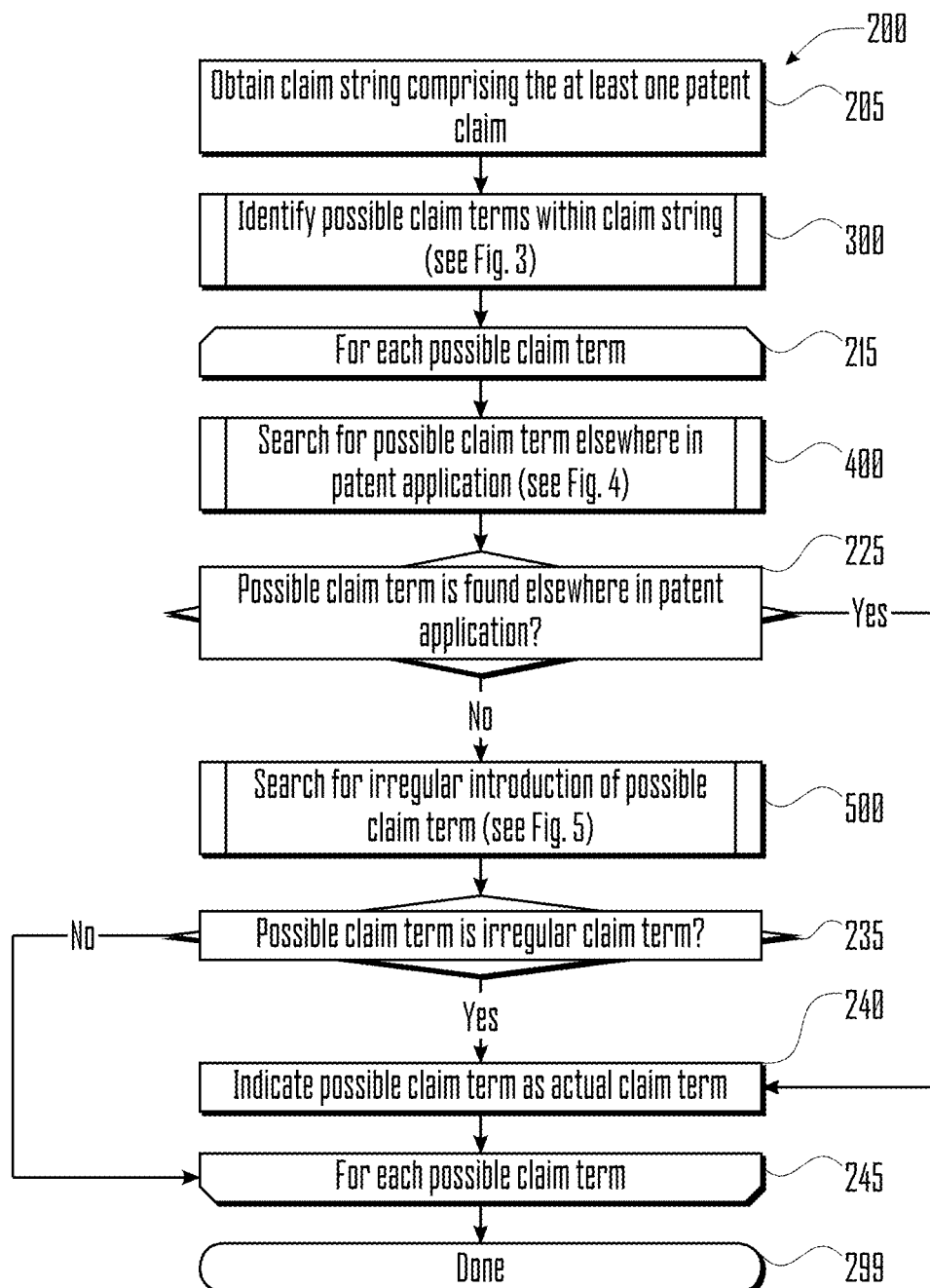
FIG. 2 illustrates a term-identification routine for automatically identifying a text sequence (term), such as may be performed by a machine display operation device in accordance with one embodiment.

FIG. 2 illustrates a term-identification routine 200 for automatically identifying a term, such as may be performed by a machine display operation device 2000 in accordance with one embodiment.

In block 205, term-identification routine 200 obtains a string comprising one or more visual text tree display block.

In subroutine block 300, term-identification routine 200 calls subroutine 300 (see FIG. 3, discussed below) to identify one or more possible terms within the string.

Beginning in opening loop block 215, term-identification routine 200 processes each possible term in turn.

In subroutine block 400, term-identification routine 200 calls subroutine 400 (see FIG. 4, discussed below) to search for other occurrences of the current possible term in the display tree structure and/or other data sources (e.g., drawings, a glossary, a description, or the like) associated with a given digital document.

In decision block 225, term-identification routine 200 determines whether the possible term is found elsewhere in a document that is associated with the at least one display tree structure. If so, term-identification routine 200 proceeds to block 240; otherwise, term-identification routine 200 proceeds to subroutine 500.

If the current possible term was not determined to be an actual term in subroutine block 400, then in subroutine block 500, term-identification routine 200 calls subroutine 500 (see FIG. 5, discussed below) to search for an irregular introduction of the current possible term within the string.

In decision block 235, term-identification routine 200 determines whether subroutine block 500 determined that the possible term is an irregular term. If so, term-identification routine 200 proceeds to block 240; otherwise, term-identification routine 200 proceeds to ending loop block 245.

In block 240, term-identification routine 200 indicates the possible term as an actual term when the possible term is found elsewhere in a document that is associated with the at least one display tree structure.

In ending loop block 245, term-identification routine 200 iterates back to opening loop block 215 to process the next possible term, if any.

Term-identification routine 200 ends in ending block 299.

Figure 3:
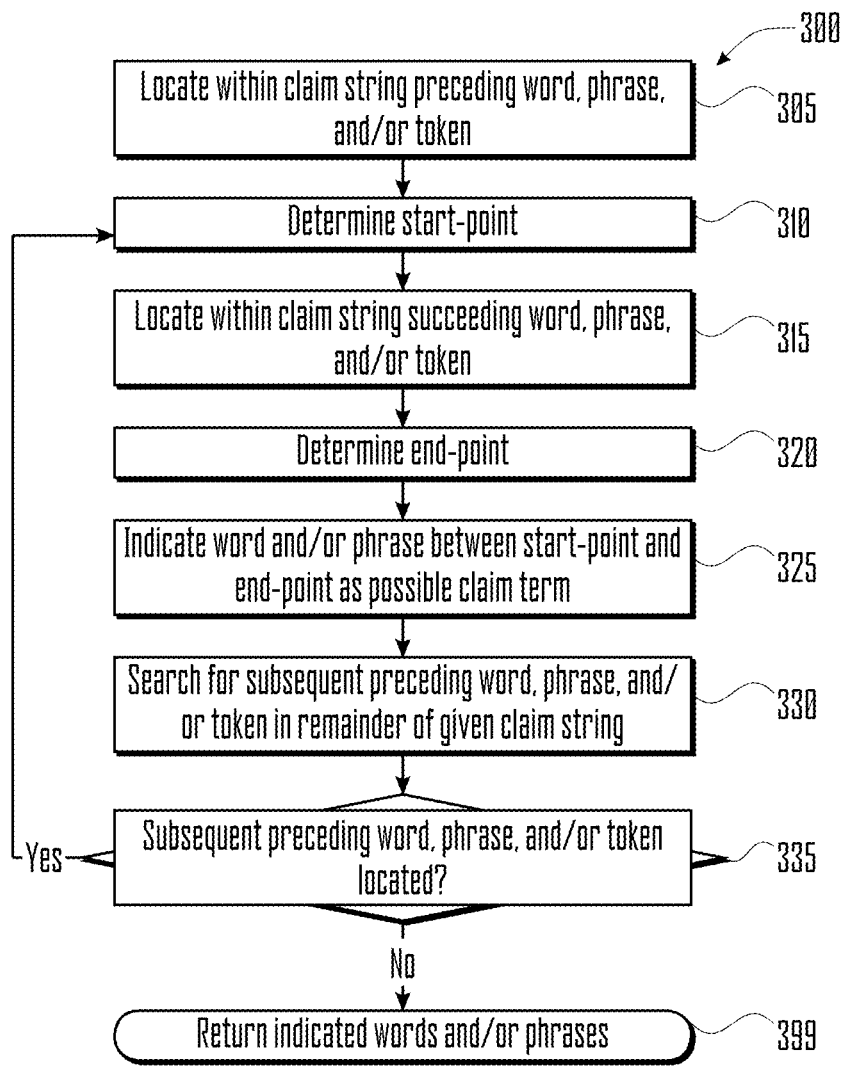
FIG. 3 illustrates a subroutine for identifying a possible term within a given string, such as may be performed by a machine display operation device in accordance with one embodiment.

FIG. 3 illustrates a subroutine 300 for identifying a possible term within a given string, such as may be performed by a machine display operation device 2000 in accordance with one embodiment.

In block 305, subroutine 300 locates within the string a 'preceding' word, phrase, and/or token. As the term is used herein, a 'preceding' word, phrase, and/or token is one that typically precedes terms, such as a definite or indefinite article.

For example, in one embodiment, a regular expression or similar pattern-matching construct similar to the following may be employed to locate a preceding word, phrase, and/or token.

/\b(?:an?|the|said)\b/

When a pattern matching construct is identified herein, it will be understood by those of skill in the art that it may be applied as a control signal to pattern matching logic to form locational boundaries within a machine memory comprising a sequence of machine symbols, e.g., text symbols.

In block 310, subroutine 300 determines a start-point based at least in part on the preceding word, phrase, and/or token located in block 305.

In block 315, subroutine 300 locates within the string the first 'succeeding' word, phrase, and/or token that follows the preceding word, phrase, and/or token that was located in block 305. As the term is used herein, a 'succeeding' word, phrase, and/or token is one that typically follows terms, such as a clause terminating punctuation token (e.g., a colon, semi-colon, or a period) and/or a linking word.

For example, in one embodiment, a regular expression or similar pattern-matching construct similar to the following may be employed to locate a succeeding word, phrase, and/or token.

/;|\.\s|\W+(?:is|are|(?:,\s)?(?:wherein|thereby|which|compris\w+))\b/

In block 320, subroutine 300 determines an end-point based at least in part on the succeeding word, phrase, and/or token located in block 315.

In block 325, subroutine 300 identifies the word and/or phrase between the start-point and the end-point as the possible term.

In block 330, subroutine 300 searches for a subsequent preceding word, phrase, and/or token in the remainder of the given string.

In decision block 335, subroutine 300 determines whether a subsequent preceding word, phrase, and/or token was located. If so, subroutine 300 proceeds to block 310; otherwise, subroutine 300 proceeds to ending block 399.

Once no more subsequent preceding words, phrases, and/or tokens can be located, subroutine 300 ends in ending block 399, returning to the caller a list of the words and/or phrases that were indicated in iterations of block 325.

Figure 4:
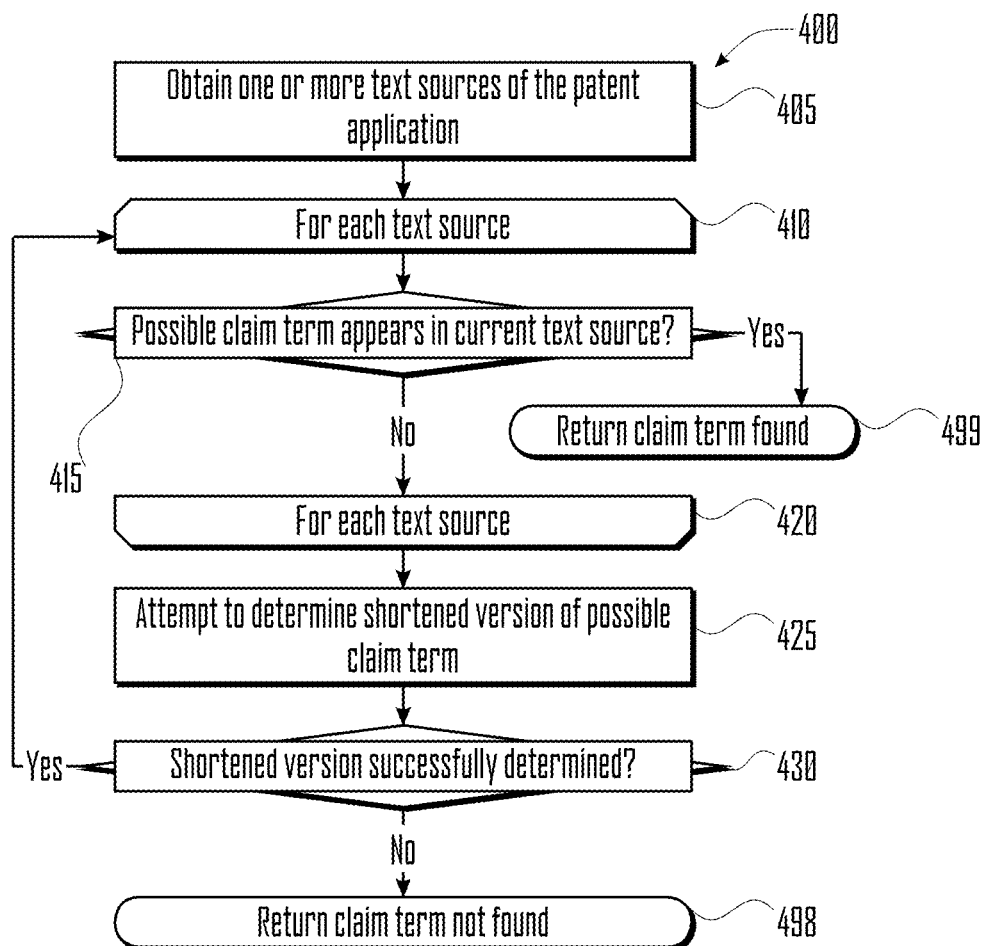
FIG. 4 illustrates a subroutine for searching for a given possible term within one or more text sources of a document that is associated with at least one text corpus and associated drawings, such as may be performed by a machine display operation device in accordance with one embodiment.

FIG. 4 illustrates a subroutine 400 for searching for a given possible term within one or more text sources of a document that is associated with at least one text corpus and associated drawings, such as may be performed by a machine display operation device 2000 in accordance with one embodiment.

In block 405, subroutine 400 obtains one or more text sources of the document. In various embodiments, the one or more text sources may include text sources similar to some or all of the following:

a plurality of labels shown in a drawing of the document;
a plurality of defined terms from a glossary of the document;
a string including one or more visual text tree display elements of the document.

Beginning in opening loop block 410, subroutine 400 processes each text source in turn.

In decision block 415, subroutine 400 searches for the possible term in the current text source to determine whether the possible term appears in the current text source. If so, subroutine 400 proceeds to ending block 499; otherwise, subroutine 400 proceeds to ending loop block 420.

Subroutine 400 ends in ending block 499, returning to the caller.

In ending loop block 420, subroutine 400 iterates back to opening loop block 410 to process the next text source, if any.

If the current version of the possible term was not determined to be an actual term in an iteration of decision block 415, then in block 425, subroutine 400 attempts to determine a shortened version of the possible term, such as by truncating the last word when the possible term includes multiple words. In some embodiments, subroutine 400 may continue truncating the last word while the last word is an unsuitable candidate (e.g., while the last word is a 'glue' word and/or an adverb).

For example, in one embodiment, a control sequence similar to the following may be operated on a machine to determine a shortened version of a possible term.

```
nlp = require("natural-language-processing-machine display control area")
wordsElementsWontEndWith = ///
  \b(?:
    [-\W]+
    | plurality
    | multiplicity
    | coupled
    | further
    | at \s+ least \s+ \w+
    | based \s+ at \s+ least \s+ in \s+ part
    | based \s+ on \b
    | , \s+ \w+
    | [:;\.](?:\s|$)
    | \s* \b (?: is|are ) \b
    | \s* \b compris \w+ \b
    | \s* \b includ(?:es?|ing) \b
    | \s*, \s+ wherein \b
    | \W* \b [cC]laims? \b
  )\s*
$///
exports.shortenTerm = shortenTerm = (txt) ->
  tokens = [ ]
  for set in nlp.partOfSpeechAnalyzer(txt)
    tokens.push set.tokens...
  while tokens.length > ⊙
    lastToken = tokens[tokens.length - 1]
    if lastToken.partOfSpeech in ['adverb', 'glue']
      tokens.pop( )
    else
      break
  out = (token.text for token in tokens).join(' ')
  replaced = no
  while wordsElementsWontEndWith.test(out)
    replaced = yes
    out = out.replace wordsElementsWontEndWith, ''
  if replaced
    out = shortenTerm out
  out
```

In decision block 430, subroutine 400 determines whether the shortened version was able to be successfully determined. If so, subroutine 400 proceeds to opening loop block 410; otherwise, subroutine 400 proceeds to ending block 498.

If no version of the given possible term could be found within the one or more text sources of the document, then subroutine 400 ends in ending block 498, returning to the caller an indication that the given possible term was not found elsewhere.

Figure 5:
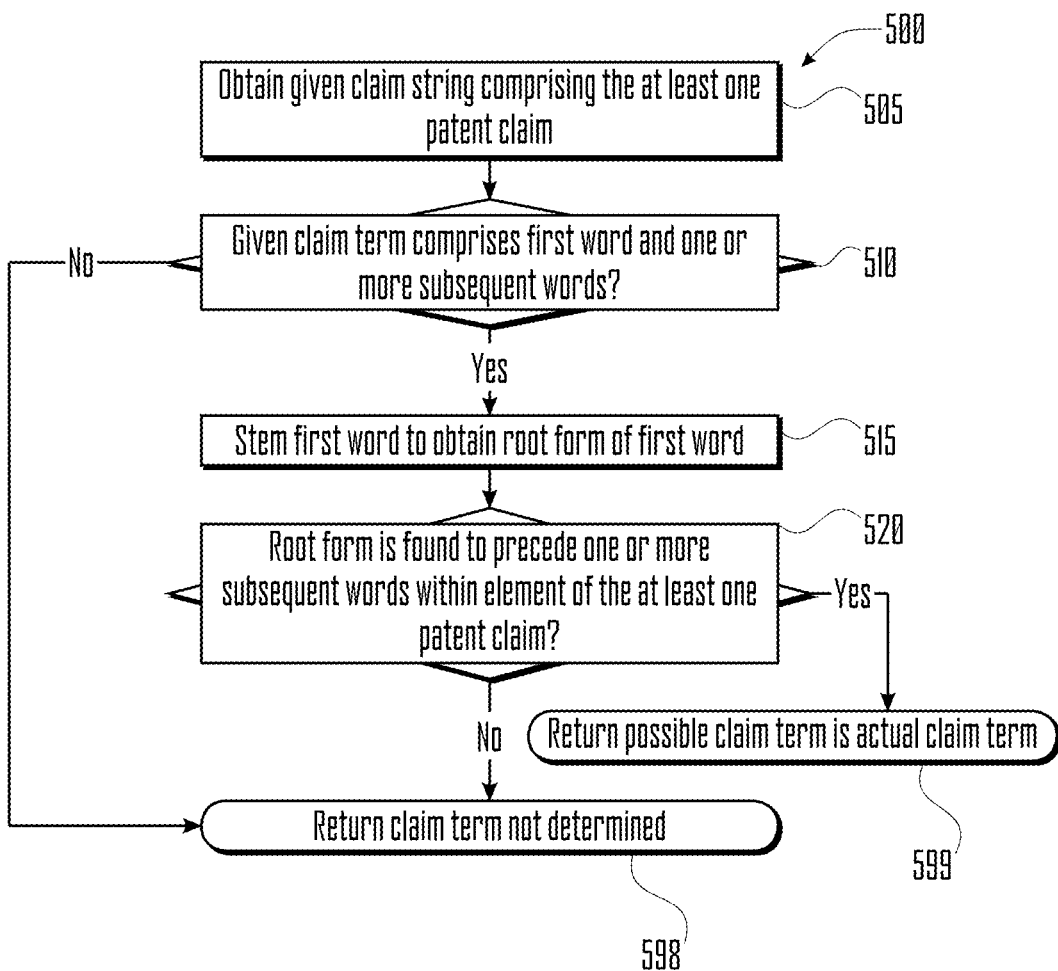
FIG. 5 illustrates a subroutine for searching for an irregular introduction of a given term within a given string, such as may be performed by a machine display operation device in accordance with one embodiment.

FIG. 5 illustrates a subroutine 500 for searching for an irregular introduction of a given term within a given string machine sequence, such as may be performed by a machine display operation device 2000 on a visual tree text structure in accordance with one embodiment.

In block 505, subroutine 500 obtains the given string, which comprises the at least one of text blocks from a visual tree text structure.

In decision block 510, subroutine 500 determines whether given term comprises a first word and one or more subsequent words. If so, subroutine 500 proceeds to block 515; otherwise, subroutine 500 proceeds to ending block 598.

In block 515, subroutine 500 stems the first word to obtain the root form of the first word.

In decision block 520, subroutine 500 determines whether the root form is found to precede one or more subsequent words within an element of the at least one visual tree text structure. If so, subroutine 500 proceeds to ending block 599; otherwise, subroutine 500 proceeds to ending block 598.

When the root form is found to precede one or more subsequent words within an element of the visual tree text structure, subroutine 500 ends in ending block 599, returning to the caller and indicating that the possible term is an actual term.

When the root form is not found to precede the one or more subsequent words within an element of the at least one visual tree text structure, subroutine 500 ends in ending block 598, returning to the caller without indicating that the possible term is an actual term.

Figure 6:
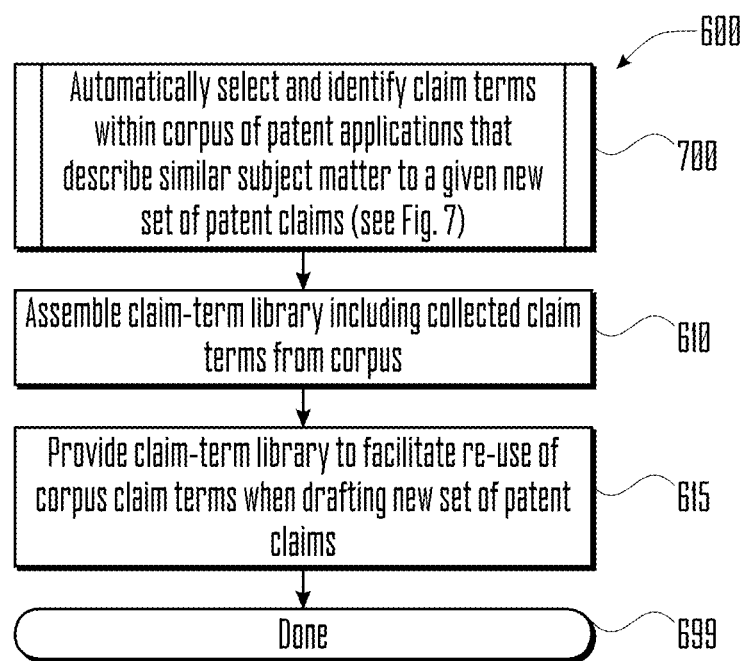
FIG. 6 illustrates a term-machine display control area routine for facilitating the forming on a machine display of a given new set of machine symbols by providing a corpus-derived term machine display control area, such as may be performed by a machine display operation device in accordance with one embodiment.

FIG. 6 illustrates a term-machine display control area routine 600 for facilitating the forming on a machine display of a given new visual text tree display by providing a corpus-derived term machine display control area, such as may be performed by a machine display operation device 2000 in accordance with one embodiment.

In subroutine block 700, term-machine display control area routine 600 calls subroutine 700 (see FIG. 7, discussed below) to automatically select and identify terms within a corpus of documents that describe similar subject matter to that which will be displayed in the new visual text tree display.

In block 610, term-machine display control area routine 600 assembles a term machine display control area including some or all of the collected terms that were identified within the corpus. For example, in one embodiment, term-machine display control area routine 600 may assemble a term machine display control area including those terms that commonly appeared within the corpus.

In block 615, term-machine display control area routine 600 provides the term machine display control area to facilitate re-use of a plurality of corpus terms when forming on a machine display the new visual text tree display.

The term-machine display control area routine 600 ends in ending block 699.

Figure 7:
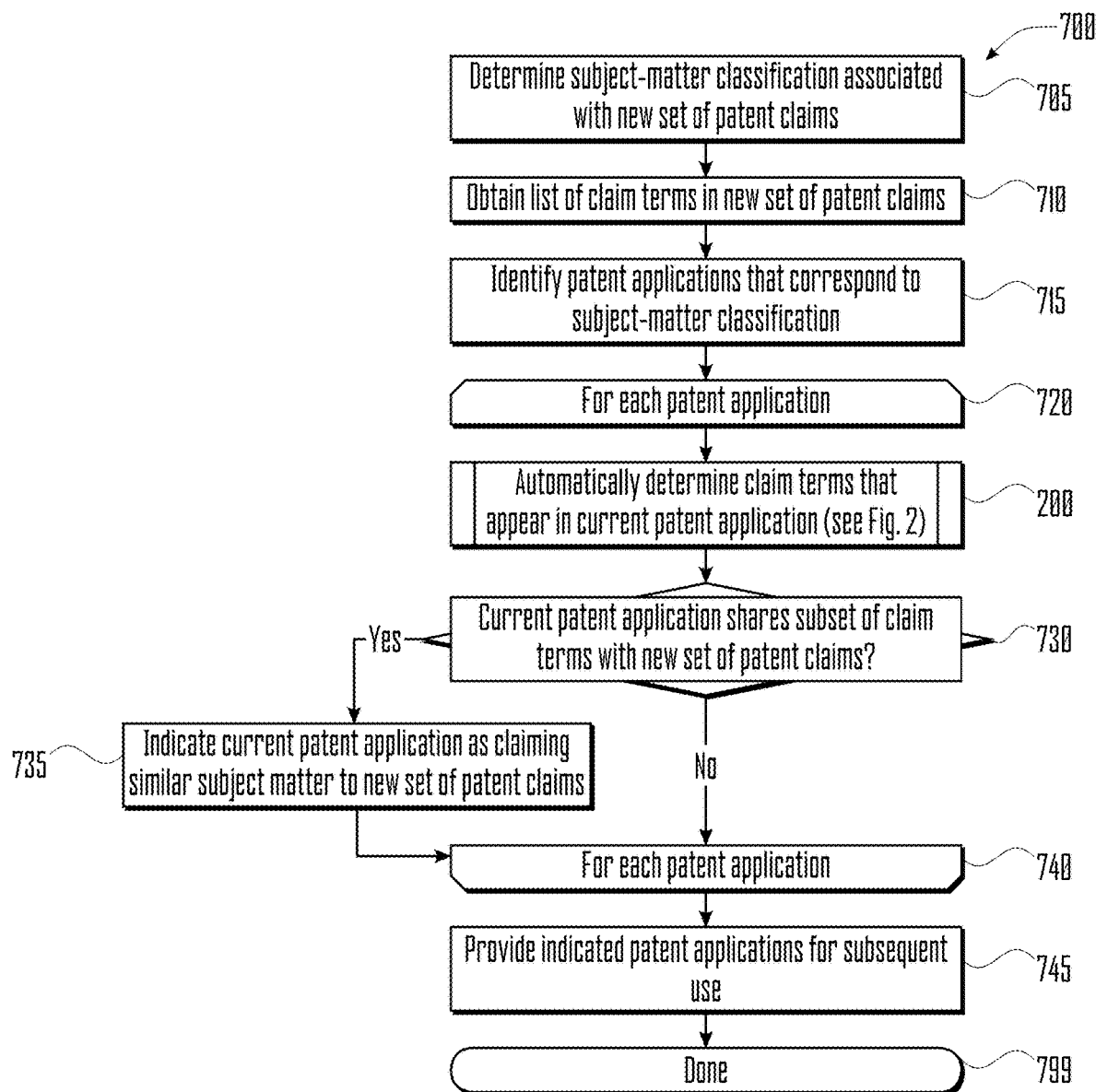
FIG. 7 illustrates a corpus-selection routine for automatically selecting and identifying terms within a corpus of text and drawings such as may be performed by a machine display operation device in accordance with one embodiment.

FIG. 7 illustrates a corpus-selection routine 700 for automatically selecting and identifying terms within a corpus of documents that describe similar subject matter to that which will be displayed in a given new visual text tree display, such as may be performed by a machine display operation device 2000 in accordance with one embodiment.

In block 705, corpus-selection routine 700 determines the subject-matter classification associated with the new visual text tree display. In some embodiments, a machine display operator may provide this information.

In block 710, corpus-selection routine 700 obtains a plurality of terms that appear or will appear in the new visual text tree display. In some embodiments, a machine display operator may provide this information. In other embodiments, a list of terms may be automatically identified based on the text of one or more of the new text corpus and associated drawings associated with the visual text tree display.

In block 715, corpus-selection routine 700 identifies a plurality of documents that correspond to the subject-matter classification. In some embodiments, the USPTO, Google Text corpus and associated drawings, or other source of published documents may be searches to identify the plurality of documents.

Beginning in opening loop block 720, corpus-selection routine 700 processes each document in turn.

In subroutine block 200, corpus-selection routine 700 calls subroutine 200 (see FIG. 2, discussed above) to automatically determine one or more terms that appear in the current document.

In decision block 730, corpus-selection routine 700 determines whether current document shares a subset of terms with the new visual text tree display. If so, corpus-selection routine 700 proceeds to block 735; otherwise, corpus-selection routine 700 proceeds to ending loop block 740.

In block 735, corpus-selection routine 700 indicates the current document as including similar subject matter to the new visual text tree display. In various embodiments, corpus-selection routine 700 may employ various tests and/or metrics to determine a similarity threshold.

In ending loop block 740, corpus-selection routine 700 iterates back to opening loop block 720 to process the next document, if any.

In block 745, corpus-selection routine 700 provides the indicated documents for subsequent use (e.g., in a term machine display control area, for analysis, or the like).

Corpus-selection routine 700 ends in ending block 799.

Figure 8:
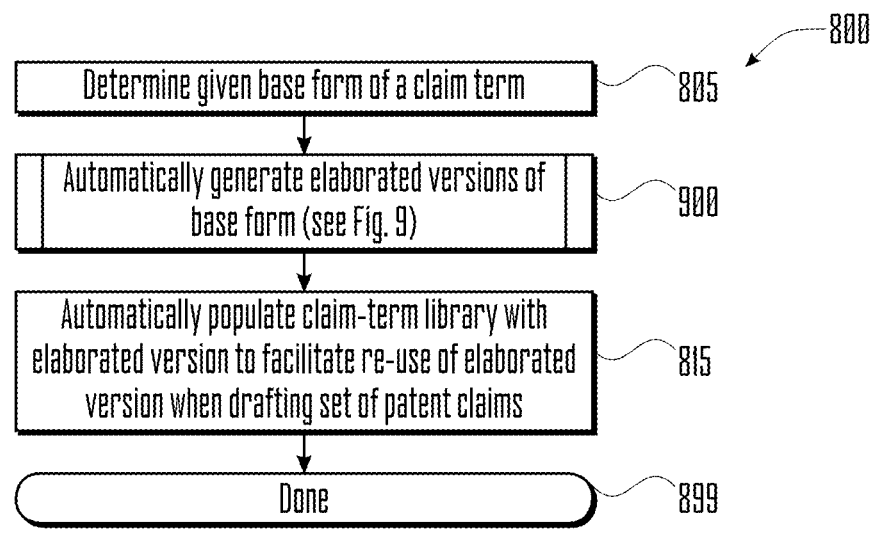
FIG. 8 illustrates a term-variant routine for automatically populating a given term machine display control area with variants of a given base form of a term, such as may be performed by a machine display operation device in accordance with one embodiment.

FIG. 8 illustrates a term-variant routine 800 for automatically populating a given term machine display control area with variants of a given base form of a term, such as may be performed by a machine display operation device 2000 in accordance with one embodiment.

In block 805, term-variant routine 800 determines the given base form of a term. For example, in one embodiment, a base form of a term may be a singular noun form, such as "text corpus and associated drawings".

In subroutine block 900, term-variant routine 800 calls subroutine 900 (see FIG. 9, discussed below) to automatically generate one or more elaborated versions of the base form. For example, in one embodiment, subroutine 900 may generate one or more variants such as a plural form (e.g., "text corpus and associated drawings"), a collective form (e.g., "a plurality of text corpus and associated drawings"), or the like.

In block 815, term-variant routine 800 automatically populates a term machine display control area with the elaborated versions to facilitate re-use of the elaborated versions when forming on a machine display the visual text tree display.

The term-variant routine 800 ends in ending block 899.

Figure 9:
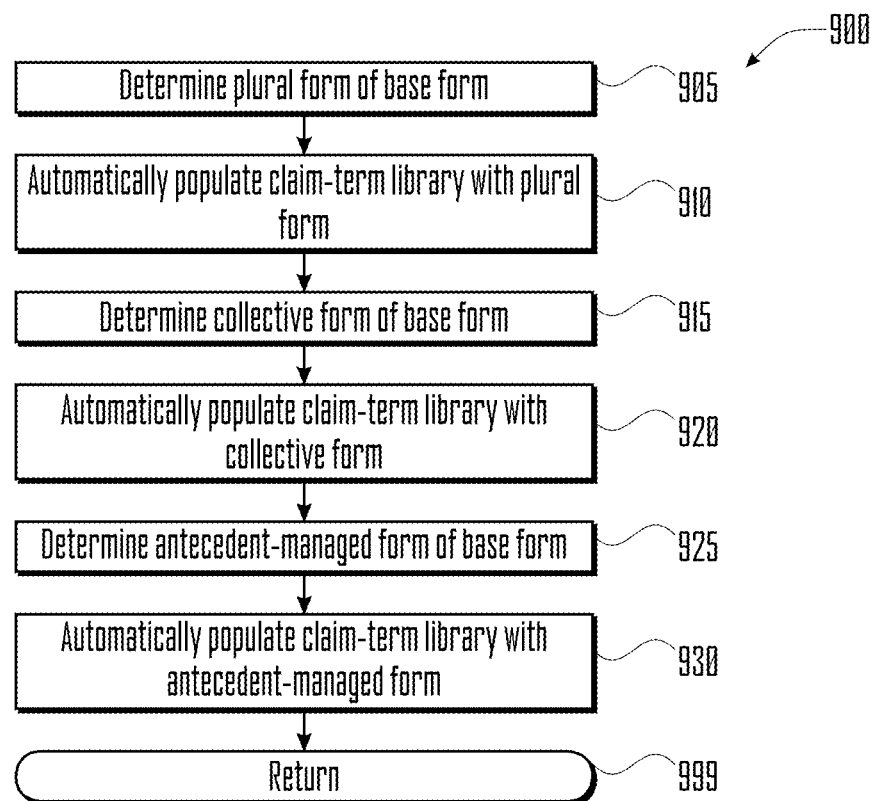
FIG. 9 illustrates a term-variator subroutine for automatically generating an elaborated version of a given base form of a term, such as may be performed by a machine display operation device in accordance with one embodiment.

FIG. 9 illustrates a term-variator subroutine 900 for automatically generating an elaborated version of a given base form of a term, such as may be performed by a machine display operation device 2000 in accordance with one embodiment.

In one embodiment, a control sequence similar to that shown below may be employed in an exemplary implementation of term-variator subroutine 900.

```
nounInflector = require 'NounInflector'
makeEntities = (termDict) ->
    for key, val of termDict
        continue if /^The/.test(key)
        continue if /^\[?an?\s/.test(val)
        camelkey = key.replace(/^_/,'"')
        pluralKey = "_" + nounInflector.pluralize(camelkey)}
        termDict[pluralKey] ?= nounInflector.pluralize(val)
        collectiveKey = "The" + nounInflector.pluralize(camelkey)
        termDict[collectiveKey] ?= "[a|the] plurality of " +
            termDict[pluralKey]
        ABControlledKey = "The" + camelkey
        termDict[ABControlledKey] ?= "[a|the] " + val
    return termDict
```

For example, given a data structure defining a base form of a term like so, {_: 'text corpus and associated drawings'}, the makeEntities function populates the data structure with several additional variations (where the notation "[a|the]" indicates that an appropriate article will be selected based on context to avoid antecedent-basis errors):

{_: 'text corpus and associated drawings',
_s: 'text corpus and associated drawings',
Thes: '[a|the] plurality of text corpus and associated drawings',
The: '[a|the] text corpus and associated drawings'}

In block 905, term-variator subroutine 900 determines a plural form of the base form, and in block 910, term-variator subroutine 900 automatically populates the term machine display control area with the plural form.

In block 915, term-variator subroutine 900 determines a collective form of the base form, and in block 920, term-variator subroutine 900 automatically populates the term machine display control area with the collective form.

In block 925, term-variator subroutine 900 determines an antecedent-managed form of the base form, and in block 930, term-variator subroutine 900 automatically populates the term machine display control area with the antecedent-managed form. In various embodiments, the antecedent-managed form is managed such that a term is automatically introduced using an indefinite article or no article depending on whether the term is singular or plural. Further, the term is automatically referenced after introduction in a given context using a definite article.

The term-variator subroutine 900 ends in ending block 999, returning to the caller.

Figure 10:
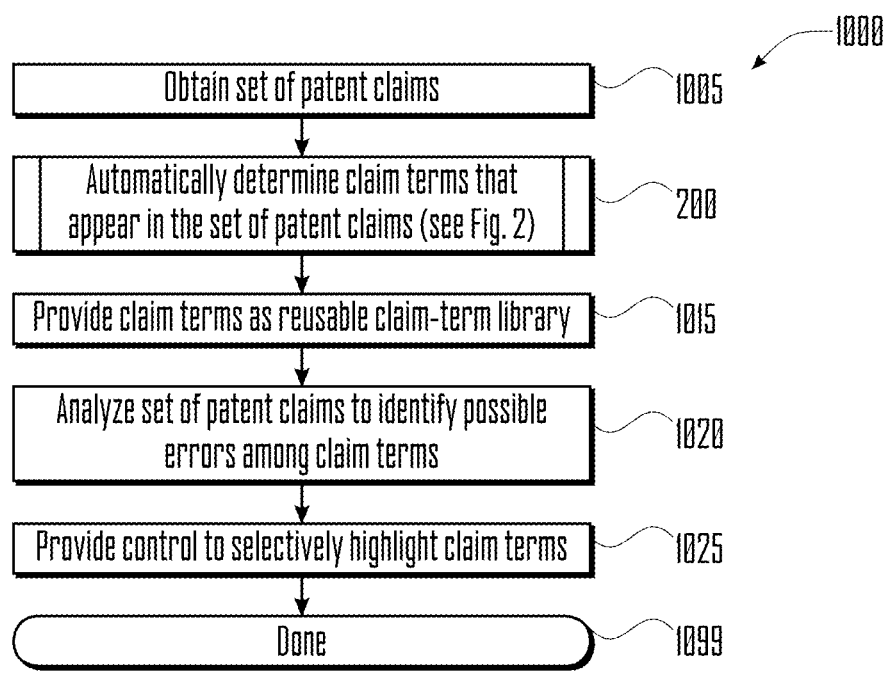
FIG. 10 illustrates a term-visualization routine for visualizing one or more terms, such as may be performed by a machine display operation device in accordance with one embodiment.

FIG. 10 illustrates a term-visualization routine 1000 for visualize one or more terms used in a visual text tree display, such as may be performed by a machine display operation device 2000 in accordance with one embodiment.

In block 1005, term-visualization routine 1000 obtains a visual text tree for display on a machine interface.

In subroutine block 200, term-visualization routine 1000 calls subroutine 200 (see FIG. 2, discussed above) to automatically determine one or more terms that appear in the visual text tree display.

In block 1015, term-visualization routine 1000 provides a plurality of terms as a reusable term machine display control area.

In block 1020, term-visualization routine 1000 analyzes the visual text tree display to identify possible errors in relationship among the terms. For example, in one embodiment, term-visualization routine 1000 may analyze the visual text tree display to identify possible antecedent-basis errors among the plurality of terms as they appear in the visual text tree display. Similarly, in some embodiments, term-visualization routine 1000 may (instead or in addition) analyze the visual text tree display to identify unsupported terms that lack support in drawings and/or a text description associated with the visual text tree display.

In block 1025, term-visualization routine 1000 provides a control to selectively highlight the plurality of terms as they appear in the visual text tree display. In various embodiments, such selective highlighting may enable a machine display operator to visually distinguish between various terms and to alert the machine display operator to possible errors.

In some embodiments, such selective highlighting may be used in connection with analyzing the visual text tree display to identify possible antecedent-basis errors among the plurality of terms as they appear in the visual text tree display. Similarly, in some embodiments, such selective highlighting may be used in connection with analyzing the visual text tree display to identify unsupported terms that lack support in the drawings and/or the description associated with the visual text tree display.

The term-visualization routine 1000 ends in ending block 1099.

Figure 11:
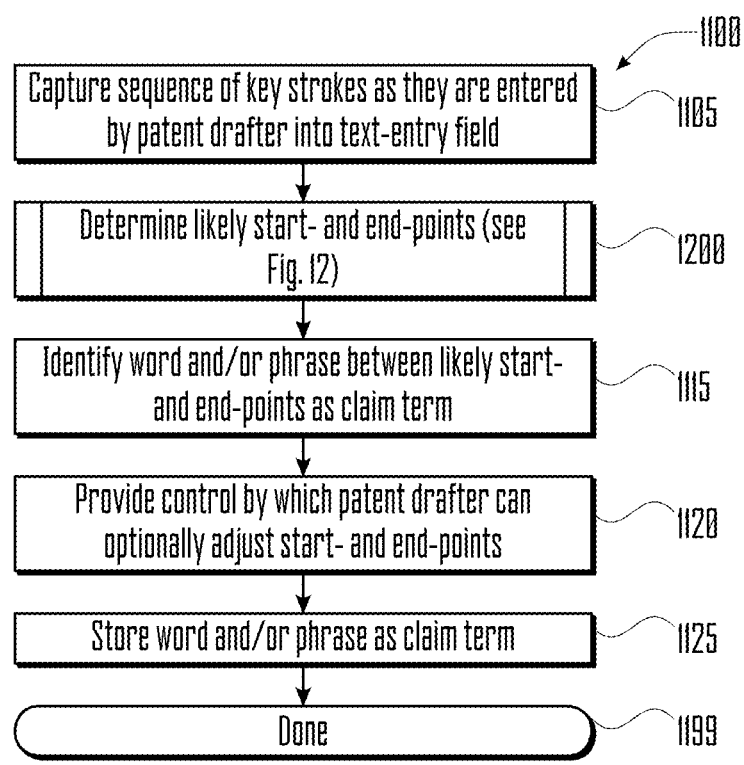
FIG. 11 illustrates a real-time term-definition routine for facilitating a definition of terms during real-time machine display operation, such as may be performed by a machine display operation device in accordance with one embodiment.

FIG. 11 illustrates a real-time term-definition routine 1100 for facilitating a machine display operator to define terms during real-time machine display operation, such as may be performed by a machine display operation device 2000 in accordance with one embodiment.

In block 1105, real-time term-definition routine 1100 captures a sequence of key strokes as they are entered by the machine display operator into a text-entry field.

In subroutine block 1200, real-time term-definition routine 1100 calls subroutine 1200 (see FIG. 12, discussed below) to determine, based at least in part on the sequence of key strokes, likely start- and end-points for a term. This may be done in real-time, as the keystrokes (or sound, converted to text) are received into the machine.

In block 1115, real-time term-definition routine 1100 identifies the word and/or phrase between the start- and end-points as a term.

In block 1120, real-time term-definition routine 1100 provides a control by which the machine display operator can optionally adjust the start- and end-points before confirming the word and/or phrase between the start- and end-points as an actual term. In an alternate embodiment, suggested terms already populated in the term machine display control area are suggested to complete the partially input words and/or phrases.

In block 1125, real-time term-definition routine 1100 stores the word and/or phrase as a term. The term may be made visible in the term machine display control area.

Real-time term-definition routine 1100 ends in ending block 1199.

Figure 12:
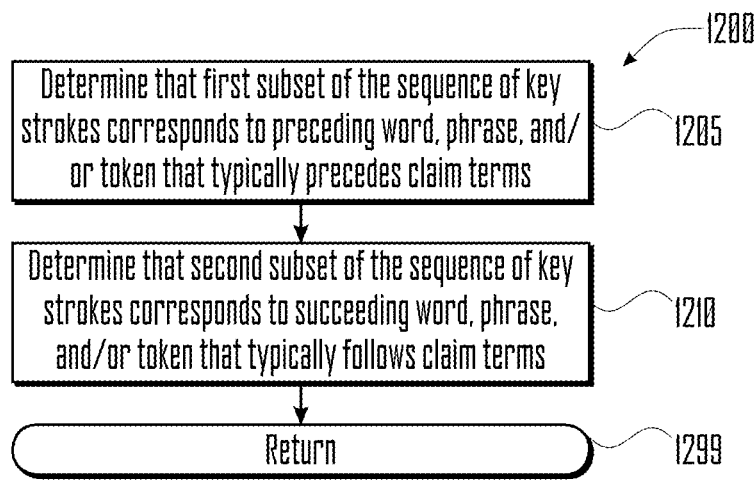
FIG. 12 illustrates a start/end-point subroutine for determining likely start- and end-points based at least in part on a given sequence of key strokes, such as may be performed by a machine display operation device in accordance with one embodiment.

FIG. 12 illustrates a start/end-point subroutine 1200 for determining likely start- and end-points based at least in part on a given sequence of key strokes, such as may be performed by a machine display operation device 2000 in accordance with one embodiment.

In block 1205, start/end-point subroutine 1200 determines that the first subset of the sequence of key strokes corresponds to the preceding word, phrase, and/or token that typically precedes terms. In some embodiments, the preceding word, phrase, and/or token may comprise a definite or indefinite article. See also block 305, discussed above.

In block 1210, start/end-point subroutine 1200 determines that the second subset of the sequence of key strokes corresponds to the succeeding word, phrase, and/or token that typically follows terms. In some embodiments, the succeeding word, phrase, and/or token may include a clause terminating punctuation token and/or a linking verb. See also block 315, discussed above.

Start/end-point subroutine 1200 ends in ending block 1299, returning to the caller.

FIG. 13 illustrates aspects of an exemplary visual text tree display forming on a machine display user-interface, such as may be displayed on a machine display operation device 2000 in accordance with one embodiment. A first block of a visual text tree display forming on a machine display user-interface 1300 shows a listing with several terms highlighted, and a term machine display control area showing several terms that are available for use and/or re-use.

A first control (for the visual text tree) that is superimposed on a machine display interface device includes identified sequences individually listed and operable, said sequences which appear in a block of text operable from a second control (for the term machine display control area). Actions on an individual sequence in the second control affect all instances of the individual sequence in the first control. For example altering an individual sequence in the first control will likewise alter all instances of the individual sequence in the block of text in the second control, by causing activation of alteration propagation logic in the machine controlling the display device. Deleting an individual sequence in the first control will likewise delete all instances of the individual sequence in the block of text in the second control, by causing activation of the alteration propagation logic in the machine controlling the display device.

Pixel activation logic is operated on a background of each instance of the individual sequences in the text block of the first control, causing them to visually stand out from the other text in the block and from one another.

Figure 14:
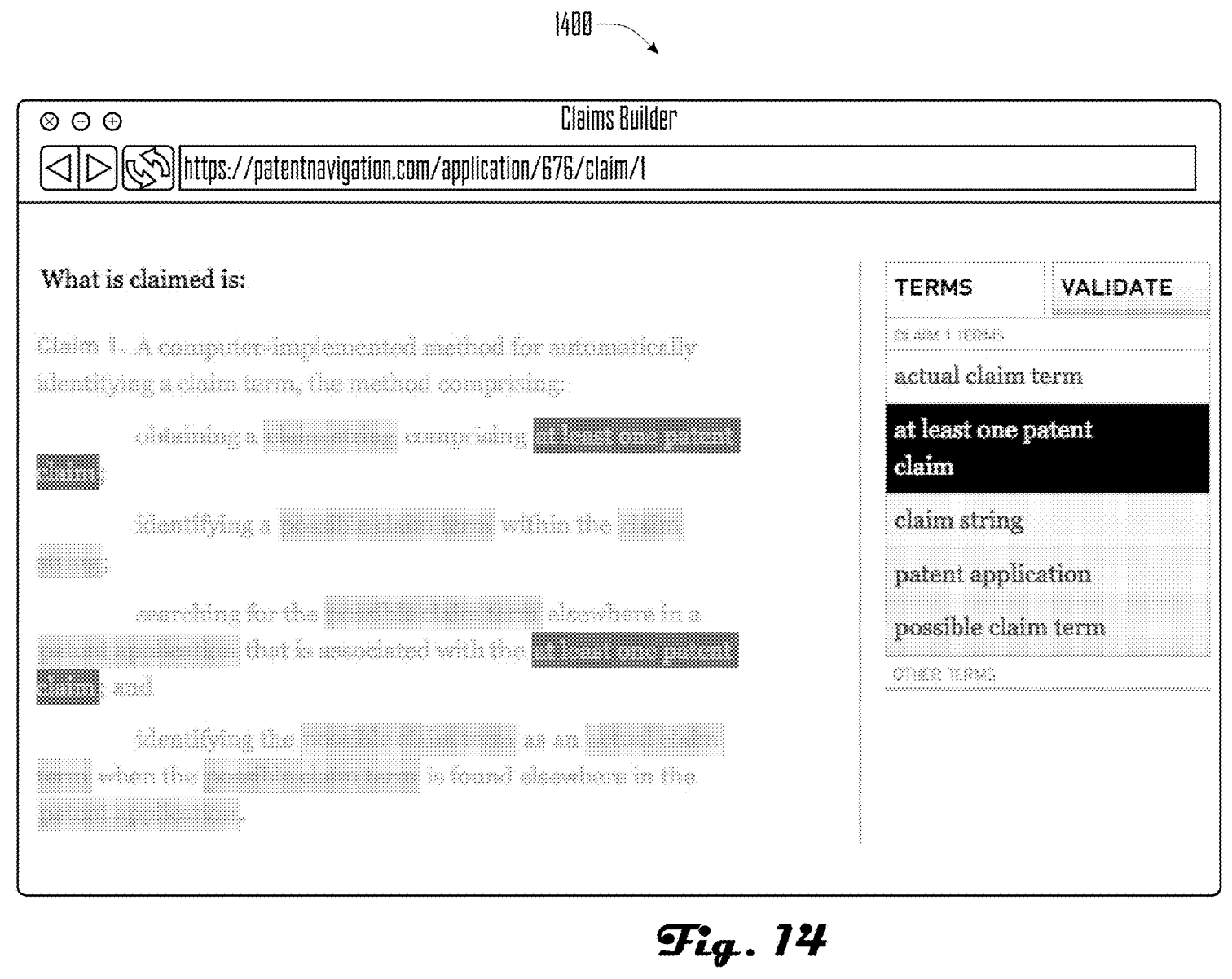

FIG. 14 illustrates aspects of an exemplary text corpus and associated drawings—forming on a machine display user-interface, such as may be displayed on a machine display operation device 2000 in accordance with one embodiment. Text corpus and associated drawings—forming on a machine display user-interface 1400 shows a listing with one of several terms selectively highlighted, and a term machine display control area showing several terms that are available for use and/or re-use. Active highlight of an individual sequence in the second control affect all instances of the individual sequence in the first control, causing active highlight different from the background highlighting of all the instances (see FIG. 13). For example highlighting an individual sequence in the first control will likewise highlight all instances of the individual sequence in the block of text in the second control, by causing activation of highlight propagation logic in the machine controlling the display device.

Figure 15:
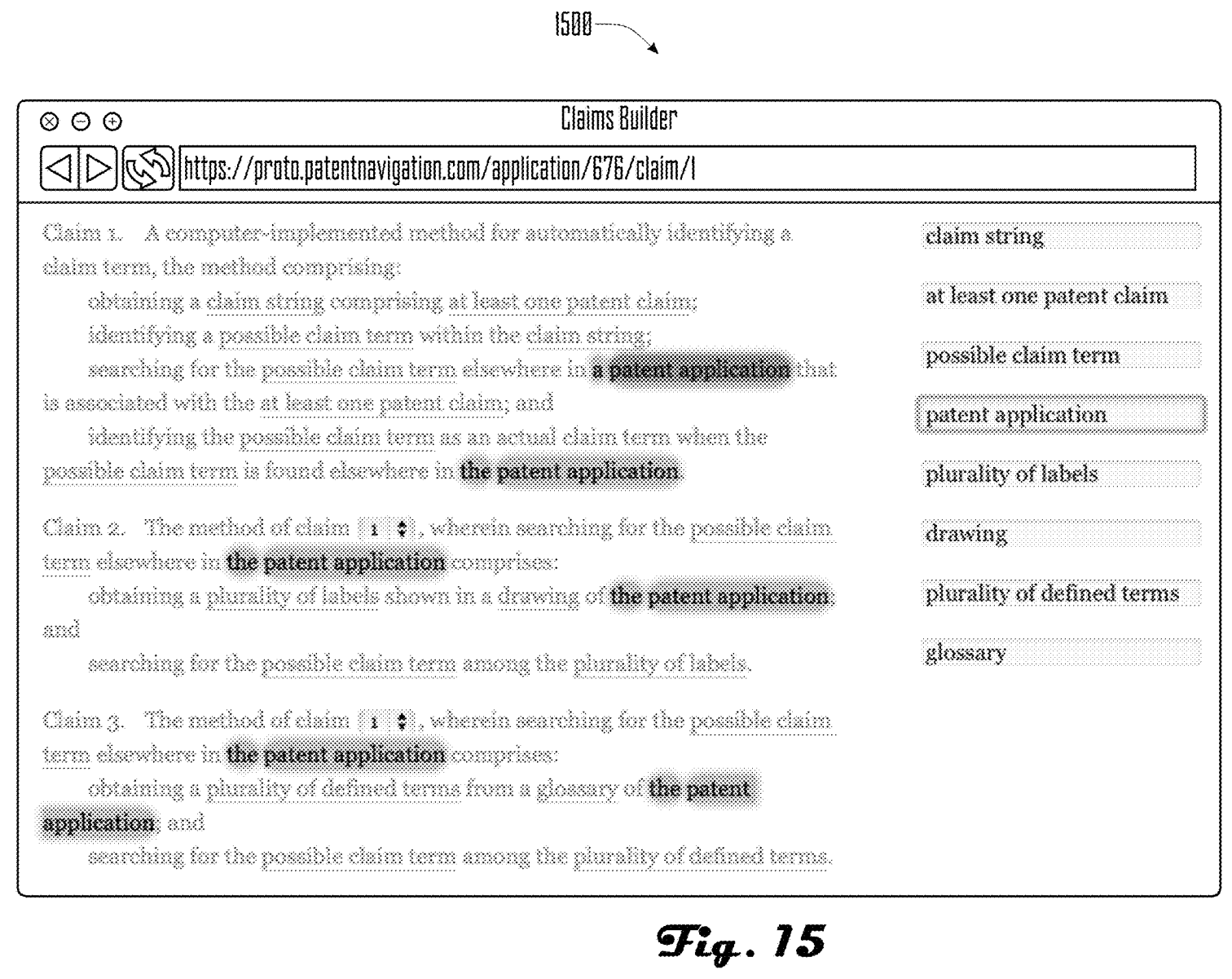

FIG. 15 illustrates aspects of an exemplary text corpus and associated drawings—forming on a machine display user-interface, such as may be displayed on a machine display operation device 2000 in accordance with one embodiment. Text corpus and associated drawings—forming on a machine display user-interface 1500 shows a term machine display control area, as well as a listing with one of the several terms selectively highlighted, such that a machine display operator can visually distinguish between a (proper) introduction of the selected term and (proper) subsequent references to the selected term. This display behavior may be implemented via the highlight and/or action propagation logic described previously, operated in conjunction with antecedent basis logic.

Figure 16:
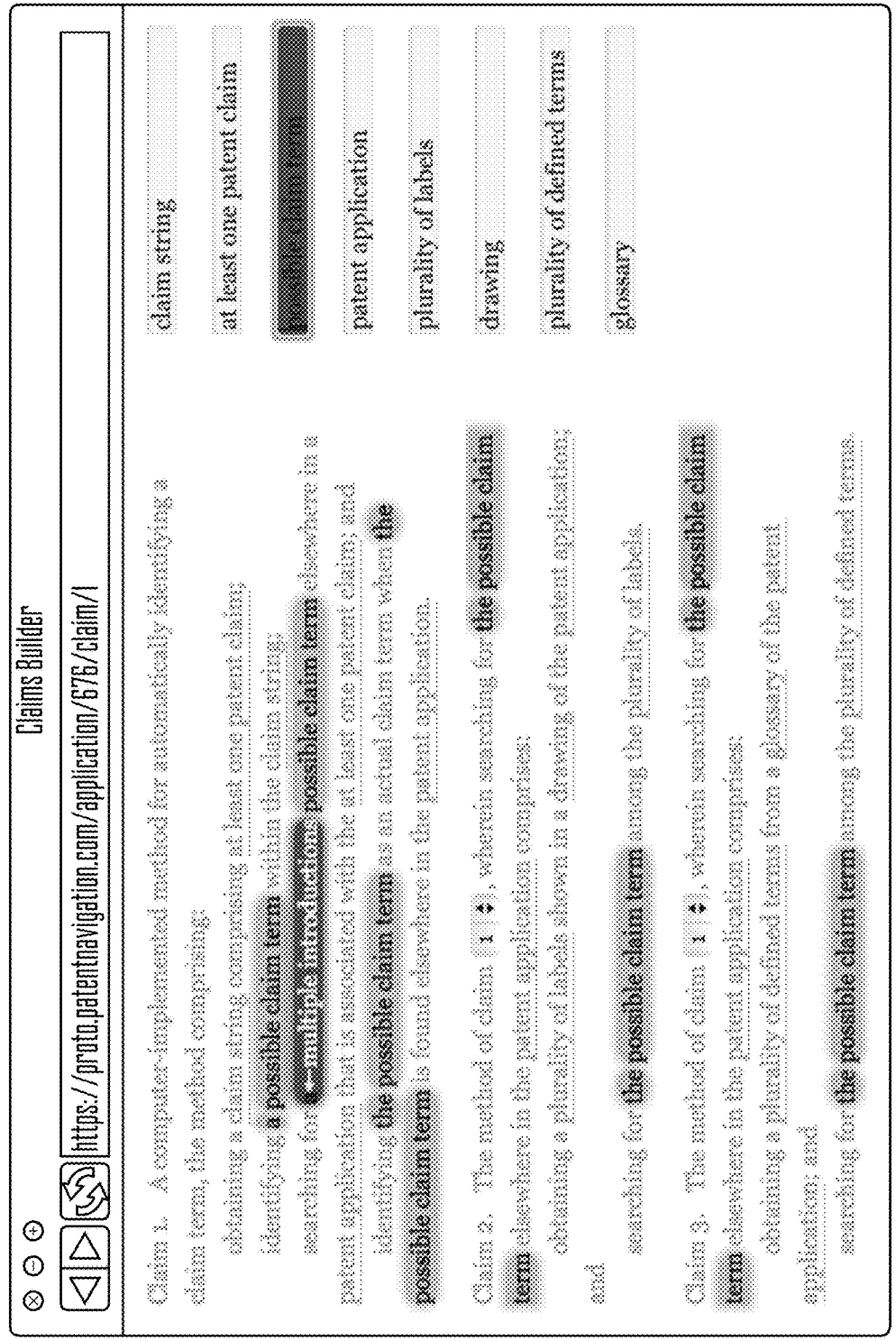

FIG. 16 illustrates aspects of an exemplary text corpus and associated drawings—forming on a machine display user-interface, such as may be displayed on a machine display operation device 2000 in accordance with one embodiment. Text corpus and associated drawings—forming on a machine display user-interface 1600 shows a term machine display control area, as well as a listing with one of the several terms selectively highlighted, such that a machine display operator can visually distinguish an improper second introduction of the selected term. This display behavior may be implemented via the highlight and/or action propagation logic described previously, operated in conjunction with antecedent basis logic.

Figure 17:
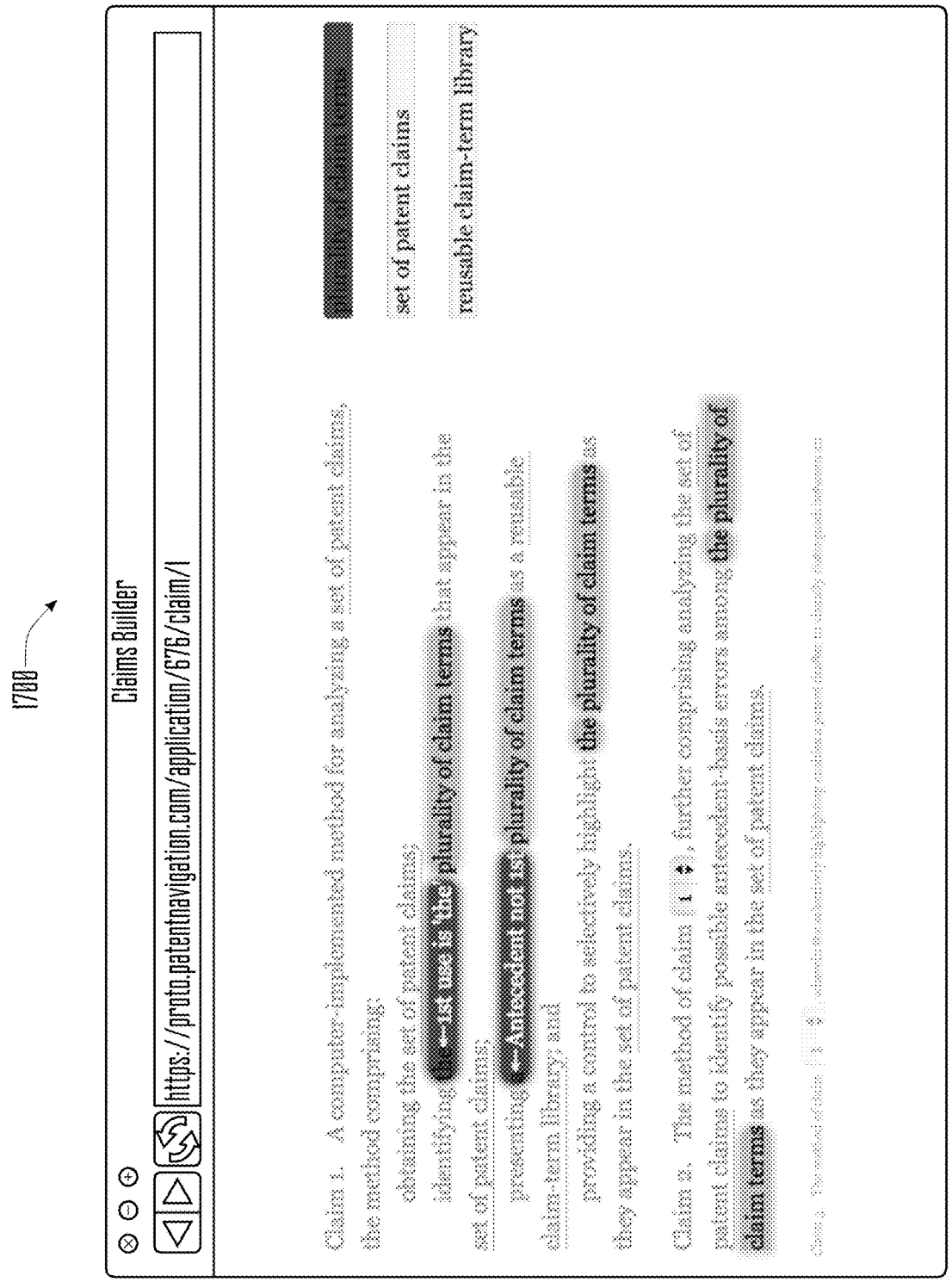

FIG. 17 illustrates aspects of an exemplary text corpus and associated drawings—forming on a machine display user-interface, such as may be displayed on a machine display operation device 2000 in accordance with one embodiment. Text corpus and associated drawings—forming on a machine display user-interface 1700 shows a term machine display control area, as well as a listing with one of the several terms selectively highlighted, such that a machine display operator can visually determine that the selected term is improperly referenced before it is introduced. This display behavior may be implemented via the highlight and/or action propagation logic described previously, operated in conjunction with antecedent basis logic and a database correlating overlay sequences with specific antecedent error types. Positional logic may be operated to align starting pixels for the overlay sequences with positions in the text of the first control where the antecedent error is detected to occur.

Figure 18:
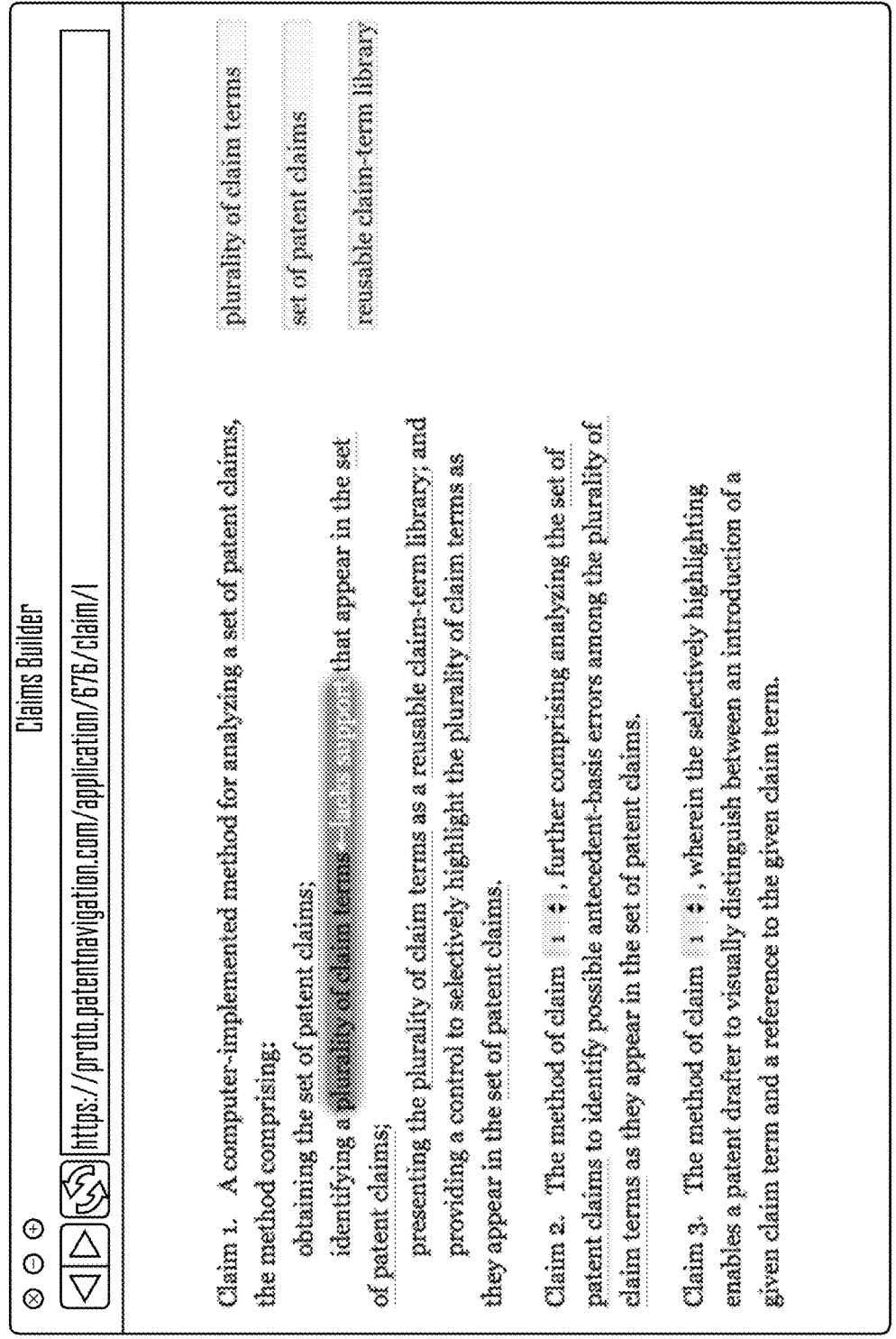

FIG. 18 illustrates aspects of an exemplary text corpus and associated drawings—forming on a machine display user-interface, such as may be displayed on a machine display operation device 2000 in accordance with one embodiment. Text corpus and associated drawings—forming on a machine display user-interface 1800 shows a term machine display control area, as well as a listing with one of the several terms selectively highlighted, such that a machine display operator can visually determine that the selected term lacks support in the description and/or drawings of an associated document. This display behavior may be implemented via the highlight and/or action propagation logic described previously, operated in conjunction with consistency logic. Positional logic may be operated to align starting pixels for the overlay sequences with positions in the text of the first control where the consistency error is detected to occur.

Figure 19:
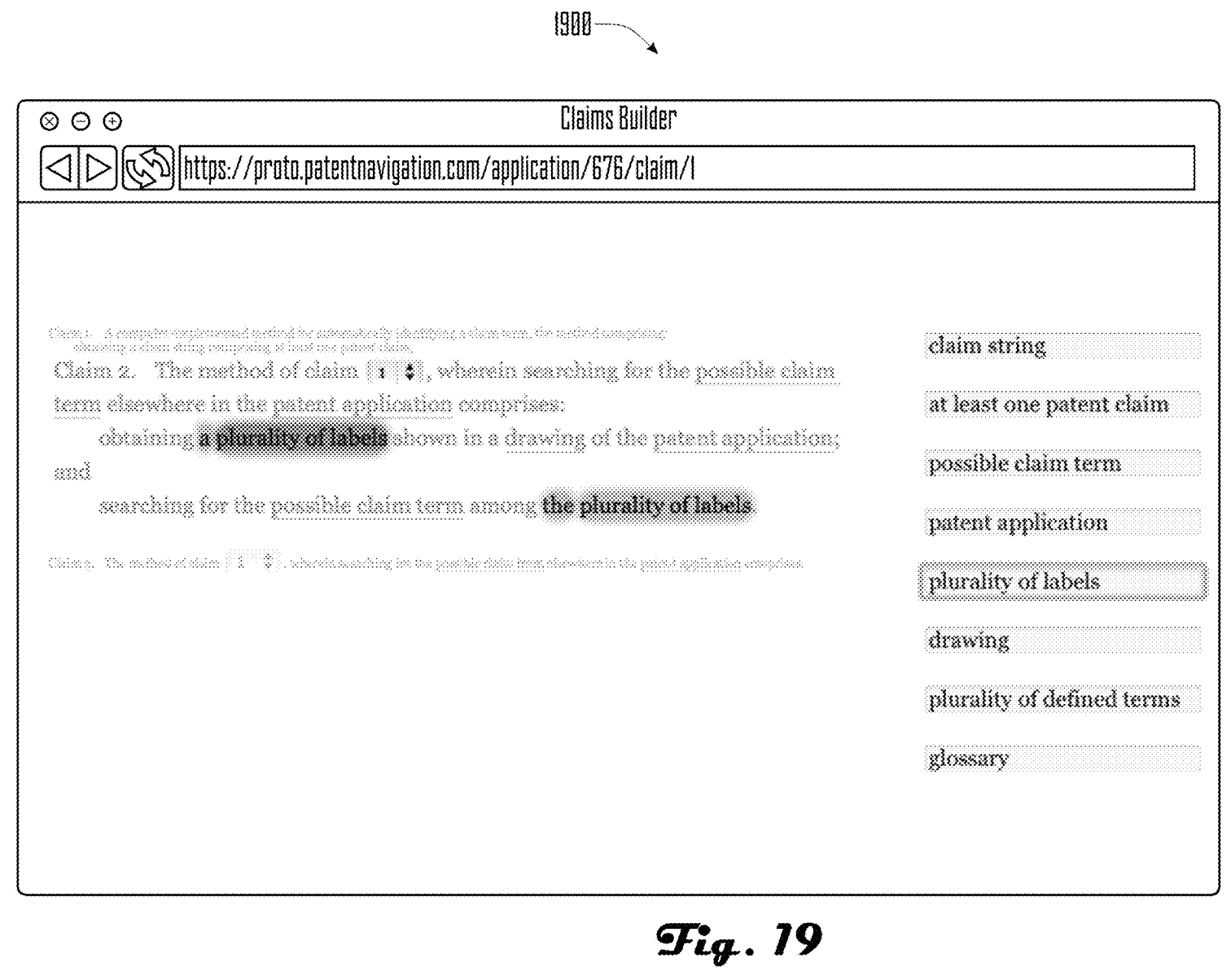

FIG. 19 illustrates aspects of an exemplary text corpus and associated drawings—forming on a machine display user-interface, such as may be displayed on a machine display operation device 2000 in accordance with one embodiment. Text corpus and associated drawings—forming on a machine display user-interface 1900 shows a term machine display control area, as well as a listing with one of the several terms selectively highlighted, such that a machine display operator can visually distinguish between visual text tree display in which the selected term appears and those in which it does not appear. This display behavior may be implemented via the highlight and/or action propagation logic described previously.

Figure 20:
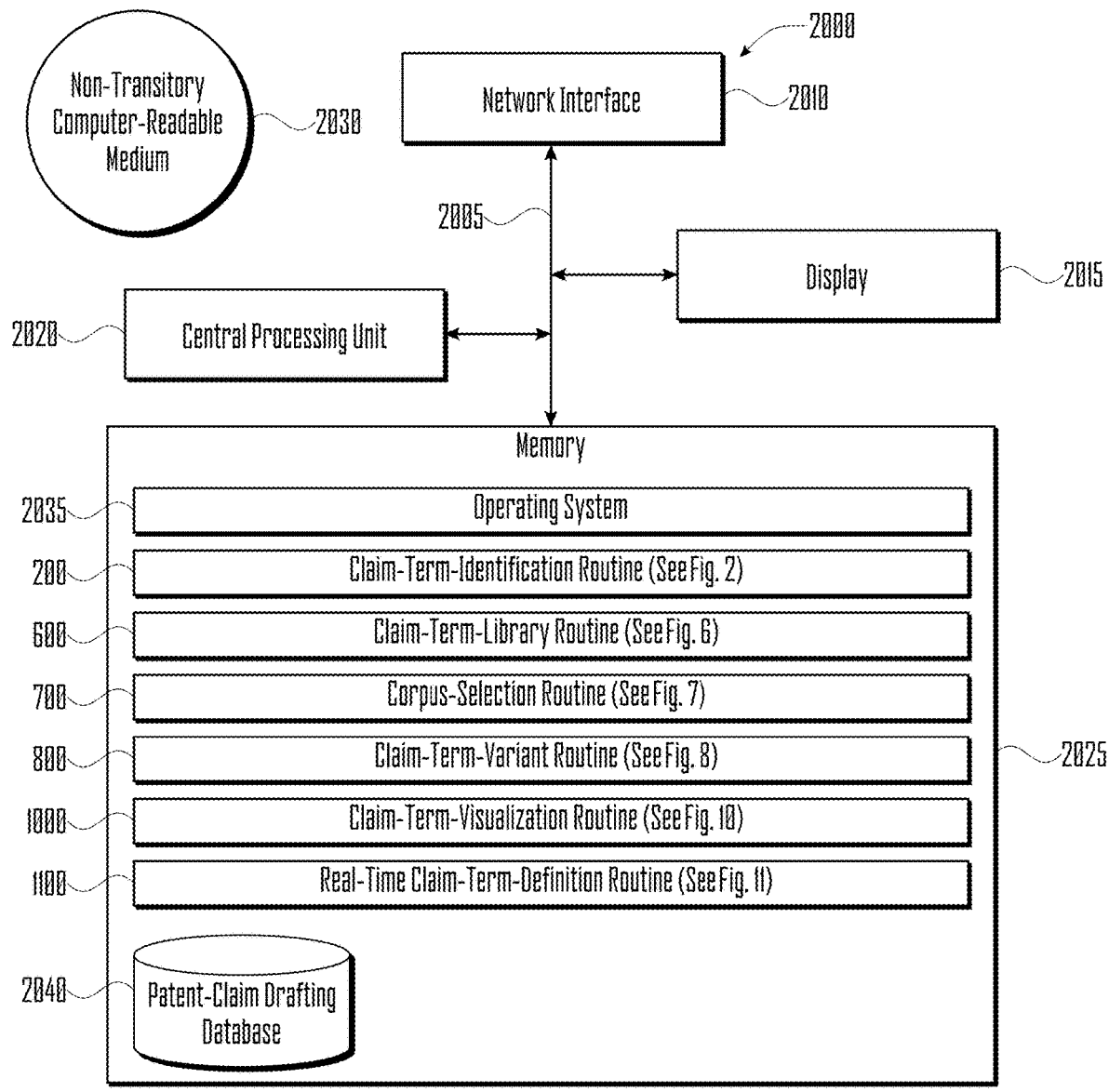
FIG. 20 illustrates several components of an exemplary machine display operation device in accordance with one embodiment.

FIG. 20 illustrates several components of an exemplary machine display operation device in accordance with one embodiment. In various embodiments, machine display operation device 2000 may include a desktop PC, server, workstation, mobile phone, laptop, tablet, set-top box, appliance, or other computing device that is capable of performing operations such as those described herein. In some embodiments, machine display operation device 2000 may include many more components than those shown in FIG. 20. However, it is not necessary that all of these generally conventional components be shown in order to disclose an illustrative embodiment.

In various embodiments, machine display operation device 2000 may comprise one or more physical and/or logical devices that collectively provide the functionalities described herein. In some embodiments, machine display operation device 2000 may comprise one or more replicated and/or distributed physical or logical devices.

In some embodiments, machine display operation device 2000 may comprise one or more computing resources provisioned from a "cloud computing" provider, for example, Amazon Elastic Compute Cloud ("Amazon EC2"), provided by Amazon.com, Inc. of Seattle, Washington; Sun Cloud Compute Utility, provided by Sun Microsystems, Inc. of Santa Clara, California; Windows Azure, provided by Microsoft Corporation of Redmond, Washington, and the like.

Machine display operation device 2000 includes a bus 2005 interconnecting several components including a network interface 2010, a display 2015, a central processing unit 2020, and a memory 2025.

Memory 2025 generally comprises a random access memory ("RAM") and permanent non-transitory mass storage device, such as a hard disk drive or solid-state drive. Memory 2025 stores program code for a term-identification routine 200 for automatically identifying a term (see FIG. 2, discussed above); a term-machine display control area routine 600 for facilitating the forming on a machine display of a given new visual text tree display by providing a corpus-derived term machine display control area (see FIG. 6, discussed above); a corpus-selection routine 700 for automatically selecting and identifying terms within a corpus of documents that describe similar subject matter to that which will be ed in a given new visual text tree display (see FIG. 7, discussed above); a term-variant routine 800 for automatically populating a given term machine display control area with variants of a given base form of a term (see FIG. 8, discussed above); a term-visualization routine 1000 for visualize one or more terms used in a visual text tree display (see FIG. 10, discussed above); and a real-time term-definition routine 1100 for facilitating a machine display operator to define terms during real-time machine display operation (see FIG. 11, discussed above). In addition, the memory 2025 also stores an operating system 2035.

These and other software components may be loaded into memory 2025 of machine display operation device 2000 using a drive mechanism (not shown) associated with a non-transitory computer-readable medium 2030, such as a floppy disc, tape, DVD/CD-ROM drive, memory card, or the like.

Memory 2025 also includes machine display operation database 2040. In some embodiments, machine display operation device 2000 may communicate with machine display operation database 2040 via network interface 2010, a storage area network ("SAN"), a high-speed serial bus, and/or via the other suitable communication technology.

In some embodiments, machine display operation database 2040 may comprise one or more storage resources provisioned from a "cloud storage" provider, for example, Amazon Simple Storage Service ("Amazon S3"), provided by Amazon.com, Inc. of Seattle, Washington, Google Cloud Storage, provided by Google, Inc. of Mountain View, California, and the like.

The following table describes features of a machine display control system. To implement these features in the system, logic components would be structurally organized to organize memory and drive a machine display system, and to interact with input devices such as computer mice, microphones, and keyboards, as well as for intercommunication as described between various logic blocks. A unique arrangement/configuration of the material of a machine memory, in conjunction with control circuitry and one or more programmable processing circuits, may be utilized to implement a novel and improved data process device that includes these features.

| | | |
|---|---|---|
| 72482468 | a Javascript API for managing the visual text tree | This would be a manager object on the invention controller that loads the visual text tree display files from the machine display control area and exposes them as a structured tree, managing persistence and whatnot. Then the visual text tree display controller would mostly be a wrapper for this manager. |
| 71617352 | a machine display control area file format for storing structured text tree | 1. Add it to the Machine display control area File Spec<br>2. Add it to the Machine display control area ORM<br>3. Add it to the snapshot schema and the invention duplicator<br>This will facilitate a count of the number of independent and dependent visual text tree display elements. |
| 71617624 | the structured visual text tree display data to appear in the snapshot | 1. Create an drawing with the new visual text tree display machine display control area elements specified in #71617352.<br>2. View the JSON snapshot. |
| 71617496 | the structured visual text tree display data to appear in the output PDF | 1. Create an drawing with the new visual text tree display machine display control areas specified in #71617352.<br>2. View the output PDF |
| 71620374 | to add an independent (root) element to my visual text tree display section | 1. In the visual text tree display section, there is an "ADD INDEPENDENT" button<br>2. Clicking this button creates a new independent (root) display tree element, numbered appropriately (the # of current visual text tree display + 1)<br>3. You can start typing the element.<br>4. There is a button at the bottom of the section named "ADD DEPENDENT" |

-continued

| | | |
|---|---|---|
| 71620776 | to add dependent visual text tree element display to any existing tree | 1. At the bottom of each tree block there's a button "ADD DEPENDENT".<br>2. Clicking this button creates a new element that is the last in the siblings of dependent visual text tree display under the current "parent" element.<br>3. visual text tree display below the added one are renumbered down.<br>4. Text is automatically added to the element: "The <term> of <parent num>, further comprising: <newline>" |
| 71622072 | to delete a block of the text tree structure | 1. Each has a hover state.<br>2. When hovered, there's a button that appears that allows you to delete visual text tree display block (e.g., element)<br>3. When clicked, there's a confirmation dialog that asks if you want to delete the block of the tree.<br>4. If you click yes to the confirmation dialog, then the block and all its descendants are deleted. |
| 71621002 | to reorder a block within the tree | 1. Clicking and dragging a block allows you to reorder visual text tree display<br>2. You cannot drag a block beyond the set of siblings to the dragging block.<br>3. Any descendant visual text tree display blocks move with the dragging block.<br>4. Once dropped, all visual text tree display blocks are renumbered to reflect the new order.<br>5. There are arrow buttons next to each row that also reorder the visual text tree display by moving the selected block and it's child visual text tree display block either up or down one position |
| 71622148 | to edit a tree block | 1. Clicking on a tree block box begins editing.<br>2. Defocusing the box clears edit mode.<br>3. Tree text is saved in the background, just like everything else. |
| 73409864 | to automatically renumber visual text tree display blocks when they are reordered (cheaply) | To make things simple, we can just scan the text of reordered visual text tree display for "block <N>" and replace <N> with the new number. We know there will be only one such reference per block. |
| 73155442 | hotkeys for indentation. | to add hotkeys for 'Tab' and 'ShiftTab' for adding/removing indentation.<br>Go to background and create a bulleted/numbered list, or shift control to tree display;<br>Instead of using the toolbar buttons use 'Tab' and 'ShiftTab' to add/remove indentation. |
| 73092688 | to create indented items within a text block | to have the formatting toolbar within the visual text tree display text fields, with the indentation *always enabled*, that is we allow the user to indent text without creating a list.<br>1. Create an independent or a dependent text block, or click on an existent block.<br>2. Write some tree text, then press Enter to get to a new line.<br>3. Open the toolbar and click indent to indent the upcoming text.<br>4. Create indented subitem(s) of the block.<br>5. Don't include list buttons in available functions visible to the user<br>6. Build out a control list for the text field area component, this will have a default list of options available to the user (which is all of them) but also allow us to pass in a list of options to show only in that certain situation. |
| 73507682 | to add an additional for the same parent instead of accidentally clicking the 'add dependent' link | This is a usability observation from many people who have used the visual text tree display feature and attempt to add another of the same parentage by clicking the 'add dependent' link.<br>there is a link below a entitled "+Add another" that when clicked, adds another just below that has the same 'parentage'<br>The 'add dependent' link is moved to the right of the 'add another' link. |
| 74235268 | the automatically-populated dependent preamble to be determined by the preamble of the parent. | GLOSSARY:<br>'Preamble' in this context refers to the first clause in a tree element, up to the first colon. For instance, if the element is:<br>"A <term> comprising:<br>Jumping up and down."<br>The preamble to the block is the text "A <term> comprising".<br>'Parent' in this context refers to the tree element control (block) for which the user is creating a dependent element in the tree control. This could be either an independent element or another dependent element. |

| | | |
|---|---|---|
| | | 'Automatically-populated' in this context refers to having the application generate text and place it into an element, rather than having the user write it him or herself.
1. When the user creates a new dependent element from either an independent or a dependent element, take the preamble text from the parent and automatically generate a preamble to the dependent element. This replaces the hardcoded "The <term> of <X>, further comprising:" text we add.
2. If element text is not properly formatted, dump out of the auto format function
3. If we dump out of the function, the text to default to "of <number>,"
4. The text of the automatically generated preamble is defined as follows:
IC == Independent
DC == Dependent
There are two text transformations of parent-preamble to child-preamble to handle as simple cases:
1. IC => DC
2. DC => DC
First: IC => DC
The relevant structure of the IC is
IC<N> ::= <1st-word> <preamble-core> <last word> ":" <body>
From the parsed IC, then the auto generated text of the DC should be:
DC ::= "The " <preamble-core> " of " <N> ", "
Where <N> is the index of the IC parent of the newly generated DC.
Spaces are significant where they appear in quotes.
(Note: operators are free to use flowery syntax in a preamble which this simple parsing would mangle. But, if the operator sticks to KISS, the above should be quite effective.)
Second: DC => DC
The relevant structure of the DC is
Parent_DC<M> ::= <head> " of " <N> ", " <tail>
From the parsed DC parent, then the auto generated text of the child DC should be:
Child_DC ::= <head> " of "<M>", "
Where <M> is the index of DC parent of the newly generated DC. |
| 75901120 | a refinement to the automatic preamble generator for DC | This is an additional filtering step in the algorithm of #74235268.
This filter becomes the first step in generating preamble text for a new DC from a given IC .
Given the text of an IC, scan its preamble (the characters up to the 1st COLON) for any COMMAs. If any COMMAs are present, discard any preamble text from the beginning of the string up to and including the last COMMA in the preamble. (And, if the last COMMA is followed by a space, delete that, too.)
Then proceed as before in #74235268 with the remaining data, treating it as the preamble of the IC.
1. From an empty visual text tree display section, create a new, empty IC (which may appear as "1")
2. Paste in the following example text:
A <term> for providing itinerary-based promotions to passengers on a mass-transport conveyance in transit, the <term> comprising:
obtaining, an itinerary describing a plurality of interim destinations.
3. Click "Add DC"
4. A DC should appear with the text: "The <term> of 1," |
| 76310764 | to restrict the creation of -parent-reference tags to other visual text tree display within the current visual text tree display family | This covers a use case where a user should not reference visual text tree display in a separate visual text tree display family. Adding this restriction will help in reducing errors.
Definition: A "family" is a collection of visual text tree display elements all descended from and including a single IC.
when editing -parent-tags in a visual text tree display family (e.g. " . . . of 2"), the user should only insert references to visual text tree display elements contained within the current visual text tree display family and never to an element in a different family.
within a family, there are no restrictions on inserting references to other visual text tree display elements within that same family (except to the one the operator is currently editing, which can never be a parent of itself). |

| | | |
|---|---|---|
| 76298876 | the ability to indicate that a piece of text is a term | This is the UI for the creation of terms<br>Prototype<br>when a user highlights some text, a highlight menu appears that contains a "Add term" option<br>if the "Add term" option is selected, the menu disappears and the text is converted into a tag which can be used elsewhere in the associated drawing and description controls |
| 76309326 | to see my visual text tree display split such that each IC is on its own page | This covers the splitting of the UI for visual text tree display into multiple pages.<br>at the top of the page, there is a sub-navigation that matches our style for the drawings tool<br>clicking the + button in the sub-navigation display control creates a new IC family which appears as a separate sub-navigation element<br>the visual text tree display navigational elements at the top should be titled "s X-Y" where X is the IC number and Y is the highest number in that family (in the event that there is a single, the format would be "X"<br>only one visual text tree display family is shown per page and clicking the sub-navigational objects navigates the user to the other family<br>as the user adds/deletes visual text tree display on each page, the numbers in the sub-navigation and the actions menu update accordingly<br>if the user has no elements, they are shown an empty control with the text "You have no <descriptor>, click the + button at the top to create a new <descriptor>" along with a + button at the top. |
| 76310452 | to reorder my families | This covers the ability to reorder families using our sub-navigation display control.<br>the user can reorder the families by dragging and dropping the sub-navigation display control elements (e.g., a set of controls each representing an entire visual text tree control)<br>if the order is changed, all the numbers are updated, both in the sub-navigation display control and in the visual text tree display on the page<br>all the tags are also updated with the new numbering |
| 76310262 | to delete a visual text tree display family | This is to delete an IC and all its DC elements.<br>Each visual text tree display family has an option in the ACTIONS menu entitled "Delete visual text tree display X-Y" where X is the IC and Y is the highest numbered DC (or "Delete X" if only one)<br>selecting this option shows an "Delete Element" dialog containing the text "Are you sure? This action cannot be undone."<br>if Yes is clicked, the family is deleted and the user is navigated to the next family of visual text tree display elements<br>Also all the visual text tree display elements are renumbered as necessary |
| 76723444 | the visual text tree display in the output to be numbered as '1', '2', etc. instead of only the number. | Currently the PDF and Word output for visual text tree display only outputs numbers for the visual text tree display to change this to say '1', '2', etc. instead.<br>Create some visual text tree display in an invention and download the PDF and Word outputs. Check whether they are numbered using 'n' instead of just 'n'. |
| 76812576 | a reusable component for left navigation | Create a component that implements affix functionality.<br>This can be placed on the left or right hand side (so the position should be configurable, but for now only left needs to be implemented).<br>this list has a fixed position, relative to the bottom of the page title<br>the inner content is specified by the outer context (the page content, through {{yield}} |
| 75860862 | a navigation experience restricted to visual text tree display and other features needed to support processing visual text tree display | The application list is changed in the following ways<br>the applicant column is removed<br>an actions column is added that contains the icons for Duplicate, Edit, and Delete<br>the action icons have tooltips that say their action (use above text)<br>clicking the "New Document" button opens a Dialog where the user can enter document metadata<br>clicking the edit icon for an application opens the Edit Dialog for above data<br>clicking the delete icon opens a confirmation dialog<br>clicking a row opens the document and navigates the user to the visual text tree display section<br>sections in the application are hidden except for the visual text tree display section<br>the profile is still accessible |

-continued

| | | |
|---|---|---|
| 76995522 | the machine display control area ORM, snapshot and duplication and word/PDF output to support families | visual tree elements are no longer organized in a tree structure at the data level. Instead, visual text tree display themselves will be represented as HTML files with machine display control area file keys of the format '//<GUID>'.<br>The order and structure of the visual text tree display will be contained in a index file, content type 'application/x-tp-s-list', with the following format:<br>...<br>{<br>  families: [<br>    { id: <family 1 ID>, s: [ <1 key>, <2 key>, ... ] },<br>    { id: <family 2 ID>, s: [ <3 key>, <4 key>, ... ] }<br>  ]<br>}<br>...<br>The traversal order is the obvious one (all elements of the first family in order, then all elements of the second family in order, etc.). The keys are the machine display control area file keys of the corresponding visual text tree display The family IDs are unique (across the invention) integer IDs that are used for routing on the client.<br>The data is no longer representing the tree structure -- that is irrelevant to the server, and can be derived from the tags contained in the visual text tree display. |
| 77134318 | the HTML editor to reflect external changes to its file | For visual text tree display we will have operations like modifying terms or un-tagging terms that will update a file that is being displayed/edited by an HTML editor component. |
| 76994970 | an API for interacting with families | The visual text tree display manager exposes an ordered list of families<br>families can be re-ordered and deleted, and new ones can be created (they start populated by a single root element)<br>Each family is an ordered list of visual text tree display<br>Presumably one of them (probably the first) is IC and the others are DC, but the visual text tree display manager doesn't enforce this is any way.<br>visual text tree display can be re-ordered and deleted<br>visual text tree display can be created and, when created, a parent can be specified. This doesn't have any strict structural implications, but just determines with what text the element will be pre-populated<br>Each element has a notion of its parent, which is the first tag positioned within the element, if any. |
| 76996214 | special key handling to make the visual text tree display operate more like one text field | Each will be in its own text field (content editable div), but to do some special key handling to make a family behave a bit more like a single text field.<br>If the user presses enter in an empty element or after a period and there is no non-whitespace content after the cursor, a new element is created a sibling of the current element, and the cursor is moved into that new element.<br>If the user presses backspace when they are at the beginning of an element that has no non-whitespace content and is not the first in the family, the element is deleted and the cursor is moved to the end of the previous element.<br>If the user presses backspace when they are at the beginning of an element that has non-whitespace content, nothing happens.<br>If the user presses up when the cursor is at the very beginning of an element that isn't the first element, the cursor moves to the end of the previous element. Note that if the user presses up when the cursor is anywhere else on the first line, the browser will move it to the beginning of the first line, and then the next keypress will be handled by us in the manner described.<br>If the user presses down when the cursor is at the very end of the an element that isn't the last element, the cursor moves to the beginning of the next element. Similar note the note in the previous bullet point.<br>If the user presses right when the cursor is at the very end of an element that isn't the last element, the cursor moves to the beginning of the next element.<br>If the user presses left when the cursor is at the very beginning of an element that isn't the first element, the cursor moves to the end of the previous element. |

| | | |
|---|---|---|
| 76751688 | to display the hierarchy for my visual text tree display when viewing a visual text tree display family | This describes the display of the parent numbers in the tree navigation control.
for each in the tree navigation control, all the element's parent numbers are displayed next to the parent number, separated by chevrons or some other delimiter
this text (not the label itself) is colored e.g., gray
if the order of the visual text tree display changes, the numbers are updated |
| 76751614 | to navigate between visual text tree display elements easily | in the visual text tree display section, for a given visual text tree display family the visual text tree display that are a part of that family are listed on the left
this list has a fixed position, relative to the bottom of the page title (should be done with #76812576)
clicking any of the visual text tree display on the left scrolls the page (animated, not immediate) such that the is in view in the top of the page, or the edge of the content container is reached.
when an element on the left is clicked, the associated is given focus
if an element in the main content is given focus, the navigational item on the left is made visually active back and forth clicking/focusing |
| 76752434 | to drag and drop the visual text tree display in the navigation visual control to reorder them | This covers dragging and dropping of visual text tree display elements in the navigation visual control. It does not include the moving of adjacent child elements.
dragging and dropping the visual text tree display in the navigation control, reorders the visual text tree display in the content menu
after reorder, references (e.g. "4") in the content are updated with the new numbers
after reorder, the displayed hierarchy in the navigation visual control is updated accordingly |
| 76336904 | the content service and visual text tree display manager to support terms | terms represented as HTML files whose machine display control area file keys are of the format '/term/<GUID>'. In addition:
The content manager exposes a list of all terms
The visual text tree display manager exposes on families a list of terms that are referenced by any in that family
The content manager will allow creating a new term. If the term's text matches an existing one, then a new term will *not* be created. The input to this method should be a range (so the content manager can do smart things that aren't covered in this, like notice if the range includes articles that shouldn't be part of the tag, or intelligently handle over-tagging).
The content manager will allow editing the content of a term
The content manager will allow removing terms (which has the side-effect of converting all tags referring to that term back to plain text) |
| 77398940 | whitespace, punctuation and articles stripped from my terms when tagifying | When converting selected text to a term, the term that is generated is transformed from what was actually selected in the following ways:
Whitespace and punctuation get stripped from the beginning and end
Articles get stripped from the beginning
List of articles: "a", "an", "the" and "said"
Post-tagification, the article remains as plain text and the non-article portion of the selection is replaced with the new tag |
| 77395706 | the content manager to convert all tags referring to an object back to plain text | |
| 76753760 | my visual text tree display to look more like a continuous page | the borders, links, and buttons that appear on hover are removed
each form has a gray left border
when the form is active (has focus, is clicked from the navigation visual control, the color of the left border and label are changed to $pni-orange2
indenting is removed
the reference (e.g. "1") is at the beginning each element and is non-editable (same as pilcrow). The font-face for the reference is dinpro medium |

-continued

| | | |
|---|---|---|
| 77394734 | the content manager to find all occurrences of a given term and convert them to tags | When the user creates a term, find all textual (not a tag or containing a tag) instances of that term across all of related controls (drawings/visual display text tree/description/etc.). As a separate operation to convert them to tags. Note that in order to support over-tagifying, a text match needs to be valid even if it completely contains some tags -- those tags are treated as if they were plain text. However, if it contains a partial tag, then it's not considered a match. |
| 77671272 | to more easily understand where an element was moved to when I drag and drop | This is adding some visual cues to help the user understand what is happening with the content when visual text tree displays are reordered using the drag and drop interface. when an element in the reorder control is clicked and held, the following actions occur<br>the in the navigation visual control transitions to 'drag' state when the element in the reorder control is released, the following actions occur<br>the visual text tree display are reordered in the content<br>the element dropped is scrolled to in the visual tree display control.<br>the element in the visual tree display control is made operationally active<br>the element in the navigation visual control is made operationally active |
| 76310648 | to duplicate a visual text tree display family | Definition of "duplicate": In this context "duplicate" means to create a new visual text tree display family with the same number of visual text tree display elements as the input family and where the text of each element is replicated/copied from the text of each source . If the input text was tagged, the new text will be tagged in exactly the same places. A single terms machine display control area is shared by all visual text tree display families in a project. The one machine display control area is in every sense global data for the whole project.<br>This covers the ability to duplicate an element family. This feature gives the user help in supporting the use case of converting one set of visual text tree display into another set. when viewing an element family, there is an option in the ACTIONS menu entitled "Duplicate visual text tree display X-Y" (or "Duplicate X" if singular)<br>selecting this option creates a duplicate set of visual text tree display and updates the numbering of the visual text tree display and their tags (note that since terms are global, no special processing of them is needed)<br>the new family is added to the end of the family list and the user is navigated to this family after successful duplication |
| 77758130 | to perform structural validations, that is, validations related to the tree structure (or lack thereof) in avisual text tree displayfamily. | The system should recognize the following cases as invalid.<br>No circular references. Associate this warning with all visual text tree display elements in the loop and specifically with their parent reference tags. (*)<br>short text: Circularity<br>long text: Check for circular reference among elements in the tree<br>placement: Above parent tags on each offending element<br>No references to non-existent visual text tree display elements(must exist in the same family). Associate this warning with all erroneous visual text tree display and specifically with their parent reference tags.(*)<br>short text: Non-existent element<br>long text: Check for reference to a non-existing element<br>placement: Above parent tag on an offending element<br>No references to later visual text tree display element. Associate this warning with all referring visual text tree display elements (not the referred to elements) and specifically with their parent reference tags.(*)<br>short text: order element<br>long text: Reference must point to an earlier element<br>placement: Above parent tag on an offending element<br>Between an element and its parent there should only be: nothing, or siblings, or descendants of siblings. Associate this warning with each element failing the test.<br>short text: grouping<br>long text: visual text tree display element should be grouped with visual text tree display element to which they refer to the extent practical<br>placement: Above parent tag on an offending element. |

| | | |
|---|---|---|
| | | IC should be 1st:
short text: independence
long text: Least restrictive element should appear first.
placement: Above or below offending element.
Exactly one IC element per family: If more than one IC element appears, associate this warning with each additional IC element.
short text: independence
long text: Least restrictive element should appear first.
placement: Above or below offending element
Exactly one IC element per family: If no IC element appears, associate this warning with element 1.
short text: independence
long text: Missing IC element?.
placement: Above or below element 1
[The (*) cases are "red" alerts, the others more "yellow" alerts. This is more of a UI/presentation issue.] |
| 76997270 | to perform antecedent basis validation | The user has a way to run this verification and view the results as a (possibly empty) list of warnings.
Each machine display control area term is validated separately.
The tree is searched depth first.
Two rules are applied:
R1 - a term must be introduced before it can be referenced within a given scope. "Scope" here refers to a particular tree or sub-tree within an element family. In other words, before a term can be referenced, it must be introduced either earlier in the text of the current element or in an ancestor element. A singular term is typically introduced with an indefinite article ("a" or "an"). A plural term is typically introduced with no preceding article. A definite article ("the" or "said") indicates a reference to a term.
R2 - a given term may only be introduced once in a given scope.
For a given term in the machine display control area, the system generates the following warning outputs as appropriate:
"Missing antecedent" warning associated with every reference to a term that is not preceded (in scope) by an introduction of that term.
short text: Missing Antecedent
long text: Unable to find antecedent for this term
placement: Above each instance of the tag in the tree.
"Terms out of order" warning is a special case of "Missing antecedent", in which an introduction of a term follows a reference to that term in a given scope.
short text: Antecedent Placement
long text: Antecedent appears after its first reference
placement: Above the antecedent and above the 1st reference to it in each distinct scope in the tree
"Multiple term introductions" warning associated with with second and subsequent introductions of the same term in the same scope.
short text: Multiple Antecedents
long text: Extra introduction of antecedent after its first occurrence
placement: above the second and subsequent introductions of the same term in the same scope
"Ambiguous term" warning occurs when a term appears with no article after that term has been introduced with "a" or "an" in a given scope. (If a plural term is introduced with no article, then a subsequent appearance of that term with no article would be a "multiple term introductions".
short text: Ambiguity
long text: Unambiguous reference requires a definite article
placement: above any such appearance of a term in the tree |
| 76996962 | to "over-tagify" an existing tag | This allows the user to highlight some text that includes a tag and choose to convert that to a term. This does not create any nested tags, just treats the existing tag as if it were plain text and then runs the normal term creation behavior.
Note that we will allow this for element tags as well. The alternative is to try to prevent the user from creating a tag in this case, which creates inconsistent behavior.
when the user highlights text that contains one or more tagged text and converts that text to a tag, the raw text is converted into a tag and the previously tagged elements are untagged.
all other occurrences of the new term are tagged, untagging any contained instances of the old term in the process |

| | | |
|---|---|---|
| 76996820 | to view my terms | This deals with the term control panel, e.g., located to the right of the visual text tree display themselves. Terms are aggregated and appear on the 1st tab of a two tab panel. This describes the appearance and presentation of the terms in general, how to navigate them, what information to present in the panel vs what information to associate with the data in the element text fields and how to present that info.<br>in the visual text tree machine display control area on the right side of page, a list of the terms are displayed in alphabetic order<br>if the machine display control area is longer than the height of the viewport, its contents may be scrolled independently of the window contents.<br>the machine display control area is visually split between terms that appear in the current family, and all other terms<br>when hovering over a term/(form) in the machine display control area, the item has a hover state and icons appear for edit and un-tagify.<br>clicking on the edit icon opens a dialog that allows the user to edit the term<br>The dialog title is "Edit term"<br>The label is "Editing will update all occurrences of the term in the visual text tree control"<br>Buttons: "CANCEL" and "SAVE"<br>clicking on the un-tagify icon un-tagifies (and deletes) the term (no confirmation dialog necessary) |
| 76752618 | to drag and reorder elements, along with their child visual text tree display elements in the navigation visual control | This covers the functionality of dragging child visual text tree display in the navigation visual control when the parent element is clicked<br>when an element is clicked and dragged in the navigation visual control, all its following/adjacent descendent visual text tree display elements are also moved<br>after reorder, all the element tags and displayed hierarchies are updated<br>UI to match visual design in attached PDF<br>page 1: hover state<br>page 2: on click state, outlines the left navigation elements of the targeted element and its descendants if any, if they are grouped below the target, and if they are in the order: children, then grandchildren, etc.<br>page 3: drag state, drop zone = the number of targeted visual text tree display elements involved. |
| 77758156 | to perform format and punctuation validation | System must flag the following cases and generate error messages associated with specific objects as follows.<br>visual text tree display elements begin with a capitalized letter. Associate warning ("Check capitalization") with each failing. This error is automatically fixable<br>short text: Capitalization<br>long text: Check capitalization<br>placement: Above or below<br>Last char of each element must be PERIOD. Associate warning ("Check final period") with each failing. This error is automatically fixable<br>short text: Punctuation<br>long text: Check final period<br>placement: Above or below<br>No interior PERIODS followed by whitespace and a capital letter (ending a sentence). Associate warning ("Check for extra periods") with each failing. This error is automatically fixable by removing suspect periods<br>short text: Punctuation<br>long text: Check for extra periods<br>placement: Above or below<br>List formatting (in a multi-line, the list of elements should be introduced by a COLON). If an element includes more than one line, the first line should end with a colon. Associate warning ("Missing colon") with each failing. This error is automatically fixable by adding a colon to the end of the first line. The automatic fix is undoable<br>short text: List format<br>long text: Check for missing colon<br>placement: Above or below<br>List formatting (in a multi-line, each line should end with an acceptable character). Associate warning ("Bad line-end") with each failing. Acceptable line-end characters are ":" (introduces a list or sub-list), "." (required at end of last line, prohibited at the ends of other lines), and ";" or "," (delimits elements in a list or a sub-list). The word "and" should follow the delimiter at the end of the penultimate line of a list or a sub-list. This error |

| | | -continued |
|---|---|---|
| | | is automatically fixable. The automatic fix is undoable. The automatic fix uses user-indicated indentation to infer the list/sub-list structure: all lines with a given indentation level are considered to be elements of a list, and line-endings are added/edited to conform with the rules described above (using a ';' as the delimiter).<br>short text: List format<br>long text: Check line endings in list<br>placement: Above or below |
| 76997114 | to get a visual indication of where a term is tagged in an element family | An operation on a term in the machine display control area will cause all tags referencing that term to be visually highlighted. See also #76996820<br>This may be done in the same way that we indicate active comment markers -- adding dynamic CSS rules.<br>When the user selects an item in the visual text tree display machine display control area all tags in the visual text tree display family referencing that term are highlighted<br>the highlight color is gray<br>Text other than the tag in question is grayed out in visual text tree display with that tag |
| 79539884 | gray out all visual text tree display when a term is clicked in the machine display control area | when a term is clicked in the machine display control area, all visual text tree display are grayed out, regardless of whether they contain the term or not |
| 77820296 | a UI control to (format/add/delete) one element to the tree | This is UI to associate a small set of actions to individual visual text tree display elements (format/add/delete). Invoke a formatting process on one element. The use case is to help the user who is forming elements on a machine display rather than importing and to do the format only when asked, as opposed to any automatic trigger. It's easier for the user to see the effect of the process and to fine-tune the format afterward if they wish. The format process is described in #77648060.<br>A control associated with individual visual text tree display element to format one element at a time.<br>invoking formats one element<br>A control associated with individual visual text tree display to add an element<br>invoking adds a sibling element EXCEPT when invoked on an IC element, in which case it should add a child element.<br>A control associated with individual visual text tree display element to delete the current element.<br>invoking deletes current element. If invoked on an IC element of a single- family, the family is deleted, unless said family is the only family, in which case nothing happens if undo last is implemented, the 1st and 3rd are revokable.<br>Menu order should be: Format, Add, Delete |
| 77519646 | to see the list of validations errors that have been found for my visual text tree control | Warnings are aggregated and appear in a special warnings control area of the display. This describes the appearance and presentation of the warnings in general, how to navigate them, what information to present in the panel vs what information to associate with the data causing the warning and how to present that info based on its type.<br>There are three classes of warnings:<br>Punctuation and Format<br>Structure<br>Antecedent<br>Opening the warnings control reveals all warnings in a list (they need to be computed) -- there will not be a button to trigger validation -- just switching to the tab will run the validation and display the results.<br>At the top of the list is a count of the warnings in the list<br>The warnings appear in separate groups related to terms (antecedent basis), structure, and format/punctuation<br>Each warning is listed on a line in the panel<br>Each warning (in its inactive state) has the following behavior on hover:<br>a tool tip, "Click for details"<br>Exposes an "X" control at the right side of the warning item in the list.<br>User may click the "X" to dismiss the current (active) warning, deleting it from the list and closing any bubbles (note that if/when validation is re-run these errors may re-appear)<br>Clicking on a warning makes it active:<br>Expands the brief warning into a more detailed and informational message (warning grows vertically as needed to accommodate) |

| | | |
|---|---|---|
| 76996308 | to copy all of the visual text tree display elements to the clipboard | Clicking outside the warning list deactivates the active state of an active warning, warning bubbles go away. The visual text tree display elements are fully editable while the warnings control is visible There is an option in the visual text tree display drop down control entitled "Copy to Clipboard" if selected, all families are copied to the clipboard |
| 78414270 | an indication of the contextual location of validation errors | When a term is active, the relevant contextual location(s) is/are highlighted, depending on the validation error Warning placement in the visual text tree: there are three placements, one for each class of warning. Punctuation & Format warnings highlight the "element <N>" text at the beginning of the element. Structure warnings either highlight the tag referencing the parent or highlight the "element <N>" text at the beginning of the element. Antecedent warnings highlight any/all offending tags of a term in the text. |
| 77648060 | the visual text tree display manager to format text upon request | Elements consist of introductory text with a right margin and 1st line indent. They may contain nested sublists, each with a deeper margin and 1st line indent. Format is derived from punctuation. Text of one element at a time to reformat upon request to avoid/fix format-validation errors. There may be a user control to format one element and/or format a whole family. COLON introduces a list/new level of indentation. List items are delimited by SEMICOLON or COMMA (but must be used consistently within a given list/sub-list). PERIOD (exactly one at the end of a) is also a valid final list item delimiter. "; and" or ", and" flags that the next item is the last in the current level of list nesting/indenting. "; and" or ", and" belongs with the item it terminates (i.e., "and" should not be the first word of a line, it should be the last word of the previous line). COMMA, COLON, and SEMI-COLON are always to be followed by a single space or new line. COMMA, COLON, and SEMI-COLON are never to be preceded by whitespace |
| 77391958 | to paste external visual text tree display elements into an import modal | There is UX to paste the visual text tree display elements in and then they parse into families. If there is only one element and that element is empty, an import button is shown in the right column if this button is clicked, a modal dialog appears that has a large text area in it If the user clicks the Import button in the dialog, whatever text has been pasted into the text area is parsed and families and visual text tree display elements are created in the app |
| 77810436 | to paste external visual text tree display elements into element 1 when my project is empty. | The user has an empty project (only one family with only an element "1" which is itself empty.). An empty project appears as a single visual text tree display family with a single empty element 1. New projects are always empty. A user may manually empty a project by deleting each family or deleting all s/each element if there is a single family or deleting any content from element 1, if 1 is the only element. Attempting to delete element 1 when 1 is the only element merely empties the text of element 1. Focus is by default on the empty element 1 when the user navigates to that page. If the user pastes text into the empty element 1 which can be parsed into multiple elements, it is so parsed, creating multiple visual text tree display elements and multiple families as needed. At the end of the parse, the first visual text tree display family is in view At the end of the parse, the focus is on element 1 and the caret is at the end of element 1. |
| 78412556 | to move focus through terms by pressing the up and down keys | when a term is active: UP/DOWN arrow keys move the active state to the previous/next item in the list of terms |
| 78164318 | an actions menu option to format an element family | An option in the action menu to format this family invoking formats all visual text tree display elements in this family if undo last is available, this action can be revoked. |

-continued

| | | |
|---|---|---|
| 77398386 | the visual text tree display manager to identify and tagify likely terms | There is a function to find all blocks of text (not containing tags) in the visual text tree display that are likely to be terms, and another function to tagify them all. |
| 77398464 | the ability to identify and tagify all likely terms | This only deals with the UI for searching and finding terms, not the logic<br>If there are no terms in the machine display control area, there is a link present that says "find and tag terms" (fa-search) When this link is clicked, an algorithm is run against all the families to identify the terms and populate them in the visual text tree machine display control area (the term control) All instances of these terms are tagged in the text |
| 77825364 | the format process to be run as part of any element import process | This is a UI that assumes a format process is available.<br>In either import work flow (paste into empty element 1 or paste into a lightbox) after the clipboard data are parsed into elements, apply the format process.<br>When visual text tree display elements are imported, they are displayed according to the format/cleanup rules/process. |
| 78415290 | to move focus through validation errors by pressing up/down keys | When a warning is active: UP/DOWN arrow keys move the active state to the previous/next warning in the list |
| 78412330 | to edit terms inline (not in a popup) | This moves the editing of terms from a popup into an inline edit box. This changes the behavior such that clicking on the edit icon does the same thing as clicking on the term list item itself -- activates it and begins inline editing.<br>when hovering over a term/(form) in the machine display control area, there is a tool tip = "Click to edit"<br>when a term is focused, it can be edited in place<br>Desired: [- when a term is edited in place, corresponding instances in the element fields are updated in sync, per keystroke]<br>Fallback: [- when a term is edited in place, corresponding instances in the element fields are updated once the term loses focus] |
| 78414494 | in-context tooltip-like bubbles to show info on validation errors | When a validation error is active, we displays the warning message in a bubble associated with a point in the visual text tree display data triggering the warning<br>The bubble appears above or below all highlighted in-context sites (see #78414270) |
| 78418850 | to see less vertical white space between element fields | Within an element the line spacing should be 1.5 lines Between visual text tree display elements the spacing should be 2.5 lines |
| 78486010 | a child of an IC element to be automatically populated with useful preambles in more cases | 1. When a child DC element is created based on an IC element having any of the preambles listed below, and the child has no siblings, the child will have a preamble in the form of "The <ed thing> of element <N>,", where <ed thing> is a plausible guess about the operator's intent.<br>1. When a child DC element is created based on an IC element, and the child has at least one sibling, the child's preamble will be copied from the lowest-numbered sibling, similar to determining the preamble for a sibling. |
| 78486686 | a sibling of an existing DC element to be automatically populated with the same preamble as the existing DC | This relates to creating a sibling of an existing DC element (e.g., when the user hits return after a period at the end of a DC). Copy the preamble of a DC element when the user creates a sibling of an existing DC element (e.g., by pressing return after a period at the end of a DC).<br>1. When a new sibling DC element is created based on an existing DC, the preamble of the new sibling DC element should be identical to the preamble of the existing DC element. The "preamble" of a DC element starts at the beginning of the element text and stops after the first element tag in the element (including whitespace and punctuation, if any, immediately following the first element tag). |
| 79377792 | the visual text tree display builder to automatically indents the next line based on the context of the previous line | When the user presses ENTER in an element, set the level of indentation for the next line we create.<br>Hitting ENTER should automatically start you on the next line in the correct indentation level. This should take into account whether or not you are continuing a current list (previous line ends in a semicolon) or beginning a new sublist (previous line ends in a colon).<br>When you hit ENTER:<br>If the current line ends in a colon (not counting whitespace): A new line should be created, and the cursor should begin at the *next* indentation level as the current line (one tabstop over) |

| | | |
|---|---|---|
| | | Else:<br>A new line should be created, and the cursor should begin at the *same* indentation level as the current line |
| 79392828 | to see lines of text that are less than a maximum width | As the window is stretched, the visual text tree display text field width should not grow to more than 600 pixels wide.<br>The format control should occupy white space to the right of the right border of the active element field.<br>The bottom of the element format control should be aligned with the bottom of the active element text field<br>The left border of the element format control should be a fixed number of pixels [#TBD 25px?] from the right border of the active element text field<br>The expanded view of the format control may obscure element text depending on context and should be opaque and not be obscured by any other element.<br>The height of the element format control should not add any height to the minimum height of a minimal (one line) element nor should it increase the fixed spacing between visual text tree display elements (2.5 lines). |
| 79039514 | a more legible font in the visual text tree display fields | There are two issues, size and type face. In TP, font dimensions are specified in pixels. Monitors typically have a density of 90-100 pixels to the inch. To achieve a size on screen of close to 12 points (a point being 1/72 of an inch) our font size needs to be 16 pixels.<br>In the visual text tree display text fields, the font size should be 16 pixels.<br>In the visual text tree display text fields, the type face should be Georgia. |
| 78838700 | to identify orphan visual text tree display and to distinguish between orphans that used to depend from different parents | This describes how to modify the text of the -reference tag so that it's more informational and less confusing.<br>The goals are to 1) indicate that the orphans are orphans, and 2) allow the user to identify orphan siblings (to distinguish between orphans that used to depend from different parents).<br>When the user deletes a parent element, the -reference tags of all of its children should be updated to read "<deleted element ABC>" where ABC is the first three characters from the deleted 's GUID. |
| 77627254 | to undo my last action in specific instances. | Undo last action: on a fixed list of destructive or messy actions (and no others): enable the user to revoke said action. This is a temporary state persisting after each action on the list, until a later action invalidates the state.<br>(list of revokable actions):<br>deleting a project<br>deleting an element<br>deleting an element family<br>invoking the formatter on one element<br>invoking the formatter on an element family<br>dragging an element or elements<br>[-- These 3 are less important --]<br>find-all-likely-tags-by-magic<br>tagify-aterm<br>untagify-aterm |
| 77627444 | , when I am able to undo my last action, I do not want to be interrupted by dialog boxes. | This is the twin of #77627254, "undo last action." As undo last comes online for each action with a warning dialog, any interstitial dialog (previously implemented) should be removed. |
| 78413814 | the terms machine display control area to handle multiple forms of the same term | Terms can have both an introductory and reference form, e.g. "selecting a <television program>" and "the <selected television program>". In such cases, there will be a mechanism for the user to associate those two forms with the same term.<br>They will show up as two different items in the visual text tree display machine display control area, but will be associated with one another to reflect their relationship. To reflect this, change sorting of the terms machine display control area so that reference forms always show up right after the introductory form of the same term.<br>Each *unique* form of a term (either one form (common case) or two forms for those terms that differ between introduction and reference) is shown in the list, as identified by the user.<br>when two machine display control area items are two forms of one term, they appear one above the other (this overrides alphabetical order) -- introductory first, then reference. |

| | | |
|---|---|---|
| 77412758 | to specify different introductory and reference forms for a term | It is not uncommon for the introductory form of a term to be different from the reference form, e.g. "the user selects a program" vs "the selected program" - "a program" and "the selected program" are different forms of the same term ("program"), and need to be treated as such for antecedent basis validation. Also, the operator is free to consider the introductory form to be "selects a program" and to tag it as such.<br>As a baseline we need the ability for the user to manually specify the two different forms of the same terms.<br>The operative rule will be that the user needs to tag both forms of a term when there are two, and will then need to associate the 1st form with the 2nd by a UI control to resolve AB warnings. The following describes when to show the control, where to show it, how to use it, and what it should look like.<br>When two strings are worded differently and both tagified, two separate items are created in the terms machine display control area (even if an expert human might know they could be the same term). (Semantic identity of differently worded strings is magic knowledge that only a human can sort out. We will only treat exact matches for now (adjusting for white space).)<br>When the 1st and 2nd forms of what should be one term (semantically) are spelled differently, an AB validation warning will be raised (not new behavior)<br>Instances in the element fields of a term without a known antecedent will be color highlighted (not new behavior)<br>(New behavior) above the (1st term instance or each term instance) display a hint bubble "Click to link antecedent"<br>Clicking the highlighted term exposes a menu of potential antecedents (the options offered are restricted to terms as follows)<br>the term is already in the term machine display control area (already tagified)<br>the term is used in the current family<br>the term need not be in scope<br>the term is not already paired with some other term<br>the term is not found in the family preceded by "the" or "said"<br>Clicking a choice from the menu links the chosen term as the antecedent of the term raising the warning. |
| 79300056 | a more informative long warning text for missing antecedents | This updates the behavior of #76997270 with a different and context DC long warning text.<br>"Missing antecedent" warning associated with every reference to a term that is not preceded (in scope) by an introduction of that term.<br>short text: Missing Antecedent<br>OLD TEXT: --long text: Unable to find antecedent for this term<br>NEW TEXT: --long text: Antecedent of? "<1st-word> . . . <last-word>"<br>After the "?" and a space in the text, up to two words of the term appear in quotes.<br>If the term has only one or two words, those appear exactly.<br>If the term has three or more words, the first word is used, followed by an ellipsis, followed by the last word of the term. |
| 78399088 | to see an enhanced visual indication of where a term is tagged in an element family | This is an enhancement over and above #76997114<br>An operation on a term in the machine display control area will cause all tags referencing that term to be visually highlighted.<br>The enhancement is visually minimizing visual text tree display element where a terms is *not* found.<br>When the user selects an item in the visual text tree display machine display control area, all visual text tree display elements where the tag does not appear are reduced to one line with an ellipses, grayed out, and the line spacing is reduced. |
| 77412460 | use the system to perform on-the-fly element validation for me | Anytime the user performs an action that could cause a validation error (e.g. adding an element tag, re-ordering s, (see below) depending on what our validation logic handles), the system should run a validation pass and update the UI to indicate that there are or aren't validation errors.<br>On the triggering events below, the validation processes are run on relevant objects and the following areas are updated according to errors that are found<br>tags in the document<br>terms in the machine display control area<br>the validation panel |

| | | |
|---|---|---|
| | | TRIGGERS:<br>Tagifying a term (validate that one term for AB)<br>Untag an *instance* of a term in an element (validate that one term in the machine display control area for AB)<br>Apply focus to one term in the machine display control area (validate that one term)<br>Add/delete/edit "a/an" "the/said" preceding a term instance.<br>Drag & drop an element (validate structure on that element and each element in its sub tree.)<br>Change a parent reference<br>validate each term appearing in the element and subtree.<br>validate structure on that element and each element in its sub tree.<br>Delete an element<br>validate each term appearing in the element and all terms in the former subtree.<br>validate structure on each element formerly DC on the deleted element.<br>AN ELEMENT losing/gaining focus<br>validate each term appearing in the element<br>validate structure on that element<br>validate format and punctuation on that element |
| 77412946 | to tell the system to fix certain validation errors for me | Some validation errors are simple enough that the system can fix them itself. So, when the user is viewing the list of validation errors, they should have the option of asking the system to fix the ones that it knows how to fix.<br>errors in the validation panel that are syntactical errors have a "Fix" button next to them<br>when the fix button is clicked, the problem area is fixed |

Although specific embodiments have been illustrated and described herein, it will be appreciated by those of ordinary skill in the art that alternate and/or equivalent implementations may be substituted for the specific embodiments shown and described without departing from the scope of the present disclosure. This application is intended to cover any adaptations or variations of the embodiments discussed herein.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other.

"Logic" refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic will vary according to implementation.

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

We claim:

1. A method comprising:
generating a text tree display control comprising a tree of text blocks, comprising at least one numbered root element for a branch comprising at least one text string terminating with a period, on a first portion of a machine display interface;
generating a term control comprising at least one individual term identified within text strings of at least one branch in the text tree display control and distinctly ordered from branches in the text tree display control on a second portion of the machine display interface;
determining a base form of the at least one individual term, wherein the base form comprises a singular noun form of the at least one individual term;
determining a plural form of the base form;
determining a collective form of the base form;
determining an antecedent-managed form of the base form,
wherein the antecedent-managed form is managed such that:
on condition the at least one individual term is singular, the at least one individual term is automatically introduced using an indefinite article; and
on condition the at least one individual term is plural, the at least one individual term is automatically introduced using no article, and
wherein the at least one individual term is automatically referenced after introduction using a definite article;
generating a custom elaboration control configured to accept at least one text entry signal;
receiving the at least one text entry signal;
generating at least one custom elaborated version based on the at least one text entry signal; and
configuring an individual area of the term control comprising the at least one individual term to display at least one of the base form, the plural form, the collective form, the antecedent-managed form, and the at least one custom elaborated version in association with the at least one individual term.

2. The method of claim 1, further comprising
operating the individual area of the term control comprising the at least one individual term to display at least one of the at least one individual term, the base form, the plural form, the collective form, the antecedent-managed form, and the at least one custom elaborated version.

3. The method of claim 1, wherein the at least one custom elaborated version of the base form comprises an introductory form and an associated reference form, and
wherein the introductory form is used for a first instance of the at least one claim term and the associated reference form is used for subsequent instances of the at least one claim term associated with the introductory form.

4. The method of claim 3, wherein the introductory form is a verb phrase comprising the at least one claim term and a present participle verb having the at least one claim term as an object, and
wherein the associated reference form is an adjective phrase comprising the at least one claim term and an adjective derived from the present participle verb modifying the at least one claim term.

5. A non-transitory computer-readable storage medium, the computer-readable storage medium including instructions that when executed by a device including a processor and memory, uniquely configure the memory and cause the device to:
generate a text tree display control comprising a tree of text blocks, comprising at least one numbered root element for a branch comprising at least one text string terminating with a period, on a first portion of a machine display interface;

generate a term control comprising at least one individual term identified within text strings of at least one branch in the text tree display control and distinctly ordered from branches in the text tree display control on a second portion of the machine display interface;

determine a base form of the at least one individual term, wherein the base form comprises a singular noun form of the at least one individual term;

determine a plural form of the base form;

determine a collective form of the base form;

determine an antecedent-managed form of the base form, wherein the antecedent-managed form is managed such that:

on condition the at least one individual term is singular, the at least one individual term is automatically introduced using an indefinite article; and on condition the at least one individual term is plural, the at least one individual term is automatically introduced using no article, and wherein the at least one individual term is automatically referenced after introduction using a definite article;

generate a custom elaboration control configured to accept at least one text entry signal;

receive the at least one text entry signal;

generate at least one custom elaborated version based on the at least one text entry signal; and configure an individual area of the term control comprising the at least one individual term to display at least one of the base form, the plural form, the collective form, the antecedent-managed form, and the at least one custom elaborated version in association with the at least one individual term.

6. The non-transitory computer-readable storage medium of claim 5, wherein the instructions further configure the memory and cause the device to:

operate the individual area of the term control comprising the at least one individual term to display at least one of the at least one individual term, the base form, the plural form, the collective form, the antecedent-managed form, and the at least one custom elaborated version.

7. The non-transitory computer-readable storage medium of claim 5, wherein the at least one custom elaborated version of the base form comprises an introductory form and an associated reference form, and wherein the introductory form is used for a first instance of the at least one claim term and the associated reference form is used for subsequent instances of the at least one claim term associated with the introductory form.

8. The non-transitory computer-readable storage medium of claim 7, wherein the introductory form is a verb phrase comprising the at least one claim term and a present participle verb having the at least one claim term as an object, and wherein the associated reference form is an adjective phrase comprising the at least one claim term and an adjective derived from the present participle verb modifying the at least one claim term.

9. A computing apparatus, the computing apparatus comprising:

a processor; and a memory storing instructions that, when executed by the processor, configure the computing apparatus to:

generate a text tree display control comprising a tree of text blocks, comprising at least one numbered root element for a branch comprising at least one text string terminating with a period, on a first portion of a machine display interface;

generate a term control comprising at least one individual term identified within text strings of at least one branch in the text tree display control and distinctly ordered from branches in the text tree display control on a second portion of the machine display interface;

determine a base form of the at least one individual term, wherein the base form comprises a singular noun form of the at least one individual term;

determine a plural form of the base form;

determine a collective form of the base form;

determine an antecedent-managed form of the base form, wherein the antecedent-managed form is managed such that:

on condition the at least one individual term is singular, the at least one individual term is automatically introduced using an indefinite article; and on condition the at least one individual term is plural, the at least one individual term is automatically introduced using no article, and wherein the at least one individual term is automatically referenced after introduction using a definite article;

generate a custom elaboration control configured to accept at least one text entry signal;

receive the at least one text entry signal;

generate at least one custom elaborated version based on the at least one text entry signal; and configure an individual area of the term control comprising the at least one individual term to display at least one of the base form, the plural form, the collective form, the antecedent-managed form, and the at least one custom elaborated version in association with the at least one individual term.

10. The computing apparatus of claim 9, wherein the instructions further configure the computing apparatus to:

operate the individual area of the term control comprising the at least one individual term to display at least one of the at least one individual term, the base form, the plural form, the collective form, the antecedent-managed form, and the at least one custom elaborated version.

11. The computing apparatus of claim 9, wherein the at least one custom elaborated version of the base form comprises an introductory form and an associated reference form, and wherein the introductory form is used for a first instance of the at least one claim term and the associated reference form is used for subsequent instances of the at least one claim term associated with the introductory form.

12. The computing apparatus of claim 11, wherein the introductory form is a verb phrase comprising the at least one claim term and a present participle verb having the at least one claim term as an object, and wherein the associated reference form is an adjective phrase comprising the at least one claim term and an adjective derived from the present participle verb modifying the at least one claim term.

* * * * *